United States Patent
Williams et al.

(10) Patent No.: US 8,064,174 B2
(45) Date of Patent: Nov. 22, 2011

(54) LEAKAGE CURRENT DETECTION AND INTERRUPTION CIRCUIT WITH IMPROVED SHIELD

(75) Inventors: Thomas S. Williams, Clearwater, FL (US); Frank S. Brugner, Jr., Clearwater, FL (US); Paul R. Gandolfi, Dade City, FL (US)

(73) Assignee: Technology Research Corporation, Clearwater, FL (US)

( * ) Notice: Subject to any disclaimer, the term of this patent is extended or adjusted under 35 U.S.C. 154(b) by 26 days.

(21) Appl. No.: 12/462,883

(22) Filed: Aug. 11, 2009

(65) Prior Publication Data

US 2009/0303642 A1   Dec. 10, 2009

Related U.S. Application Data

(60) Division of application No. 11/482,251, filed on Jul. 7, 2006, now Pat. No. 7,623,329, and a continuation-in-part of application No. 11/324,087, filed on Dec. 30, 2005, now Pat. No. 7,751,161.

(60) Provisional application No. 60/641,187, filed on Jan. 4, 2005.

(51) Int. Cl.
*H02H 3/00* (2006.01)
*H02H 9/08* (2006.01)

(52) U.S. Cl. ............ 361/42; 361/43; 361/44; 361/45; 361/46; 361/47; 361/48; 361/49

(58) Field of Classification Search ............ 361/42
See application file for complete search history.

(56) References Cited

U.S. PATENT DOCUMENTS

| | | |
|---|---|---|
| 3,590,325 A | 6/1971 | McMillen |
| 3,619,688 A | 11/1971 | McQueen et al. |
| 3,657,603 A | 4/1972 | Adams |
| 3,719,859 A | 3/1973 | Frantz et al. |
| 3,784,846 A | 1/1974 | Krick et al. |
| 3,814,991 A | 6/1974 | Hewitt |
| 3,950,675 A | 4/1976 | Weber et al. |
| 3,996,496 A | 12/1976 | Volk, Jr. |
| 4,038,061 A | 7/1977 | Anderson et al. |
| 4,122,413 A | 10/1978 | Chen |
| 4,131,927 A | 12/1978 | Tsuchiya et al. |
| 4,205,358 A | 5/1980 | Washington |
| 4,281,358 A | 7/1981 | Plouffe et al. |

(Continued)

OTHER PUBLICATIONS

Belden Inc. Belden Electronics Division Catalog. Ref. MCAT-2003. Copyright Belden Inc. 2003.

*Primary Examiner* — Dharti Patel
(74) *Attorney, Agent, or Firm* — Frijouf, Rust & Pyle, P.A.

(57) ABSTRACT

A circuit is disclosed for disconnecting a power source upon the detection of a leakage current comprising a power cable having an insulated first and a second wire. The power cable has a conductive shield surrounding the first and second wires with a drain wire electrically contacting the conductive shield. A disconnect switch is interposed between the power source and the power cable. A primary circuit controls the disconnect switch. A secondary circuit is connected to the drain wire for sensing a leakage current between the conductive shield and one of the first and second wires. An optical switch interconnects the primary circuit and the secondary circuit for opening the disconnect switch upon the secondary circuit sensing a leakage current.

11 Claims, 16 Drawing Sheets

U.S. PATENT DOCUMENTS

| | | | |
|---|---|---|---|
| 4,352,998 A | 10/1982 | Baker et al. |
| 4,415,943 A | 11/1983 | Wortman |
| 4,424,544 A | 1/1984 | Chang et al. |
| 4,502,287 A | 3/1985 | Hare et al. |
| 4,543,527 A | 9/1985 | Schuchmann et al. |
| 4,554,463 A | 11/1985 | Norbeck et al. |
| 4,580,186 A | 4/1986 | Parker et al. |
| 4,584,623 A | 4/1986 | Bello et al. |
| 4,717,841 A | 1/1988 | Dumortier et al. |
| 4,858,056 A | 8/1989 | Russell |
| 4,931,894 A | 6/1990 | Legatti |
| 4,947,278 A | 8/1990 | Nichols, III |
| 4,979,070 A | 12/1990 | Bodkin |
| 5,037,999 A | 8/1991 | VanDeusen |
| 5,065,104 A | 11/1991 | Kusko et al. |
| 5,107,076 A | 4/1992 | Bullock et al. |
| 5,132,491 A | 7/1992 | Mulrooney et al. |
| 5,142,428 A | 8/1992 | Takeda |
| 5,208,426 A | 5/1993 | Kennedy et al. |
| 5,212,350 A | 5/1993 | Gebs |
| 5,216,202 A | 6/1993 | Yoshida et al. |
| 5,229,730 A | 7/1993 | Legatti et al. |
| 5,237,480 A | 8/1993 | Dara |
| 5,254,188 A | 10/1993 | Blew |
| 5,262,691 A | 11/1993 | Bailey et al. |
| 5,293,001 A | 3/1994 | Gebs |
| 5,329,064 A | 7/1994 | Tash et al. |
| 5,365,394 A | 11/1994 | Ibarguengoitia |
| 5,391,836 A | 2/1995 | Bortas et al. |
| 5,416,268 A * | 5/1995 | Ellis ............................... 174/36 |
| 5,418,678 A | 5/1995 | McDonald |
| 5,455,469 A | 10/1995 | Ward |
| 5,459,336 A | 10/1995 | Kato |
| 5,463,521 A | 10/1995 | Love |
| 5,528,445 A | 6/1996 | Cooke et al. |
| 5,600,524 A | 2/1997 | Neiger et al. |
| 5,661,623 A | 8/1997 | McDonald et al. |
| 5,774,316 A | 6/1998 | McGary et al. |
| 5,847,913 A | 12/1998 | Turner et al. |
| 5,889,643 A | 3/1999 | Elms |
| 6,002,563 A | 12/1999 | Esakoff et al. |
| 6,014,297 A | 1/2000 | Clarey et al. |
| 6,057,996 A | 5/2000 | Kim |
| 6,091,591 A | 7/2000 | Heinz et al. |
| 6,111,732 A | 8/2000 | Beland |
| 6,111,733 A | 8/2000 | Neiger et al. |
| 6,218,647 B1 | 4/2001 | Jones |
| 6,252,365 B1 | 6/2001 | Morris et al. |
| 6,262,871 B1 | 7/2001 | Nemir et al. |
| 6,265,667 B1 | 7/2001 | Stipes et al. |
| 6,292,337 B1 | 9/2001 | Legatti et al. |
| 6,381,113 B1 | 4/2002 | Legatti |
| 6,404,265 B1 | 6/2002 | Guido, Jr. et al. |
| 6,414,829 B1 | 7/2002 | Haun et al. |
| 6,504,691 B1 | 1/2003 | Matsui et al. |
| 6,525,914 B1 | 2/2003 | Legatti |
| 6,697,238 B2 | 2/2004 | Bonilla et al. |
| 6,807,036 B2 | 10/2004 | Baldwin |
| 6,829,123 B2 | 12/2004 | Legatti et al. |
| 6,850,394 B2 | 2/2005 | Kim |
| 7,136,266 B2 * | 11/2006 | Gershen et al. ............... 361/42 |
| 2002/0145838 A1 | 10/2002 | Bonilla et al. |
| 2003/0202310 A1 | 10/2003 | Field et al. |
| 2004/0037018 A1 | 2/2004 | Kim |
| 2004/0070895 A1 | 4/2004 | Gershen et al. |
| 2004/0070899 A1 | 4/2004 | Gershen et al. |
| 2004/0190686 A1 | 9/2004 | Tidwell et al. |

\* cited by examiner

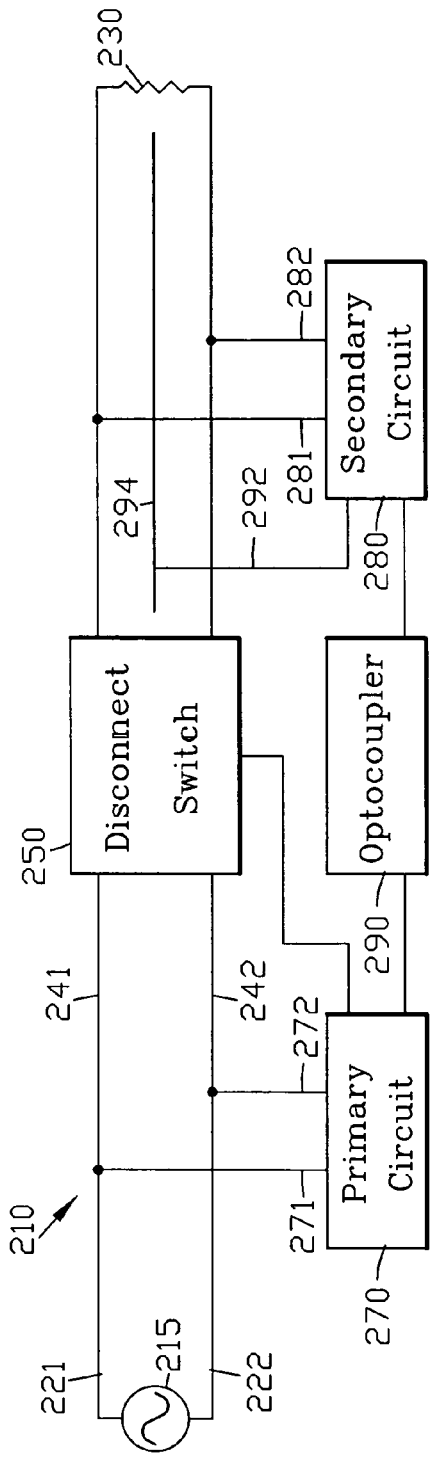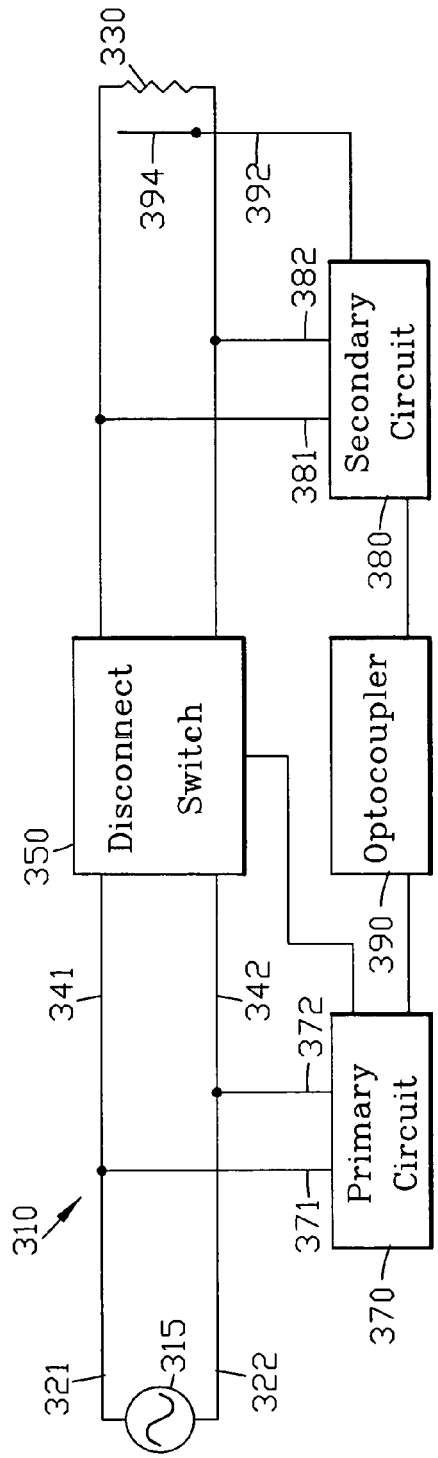
FIG. 18
FIG. 19

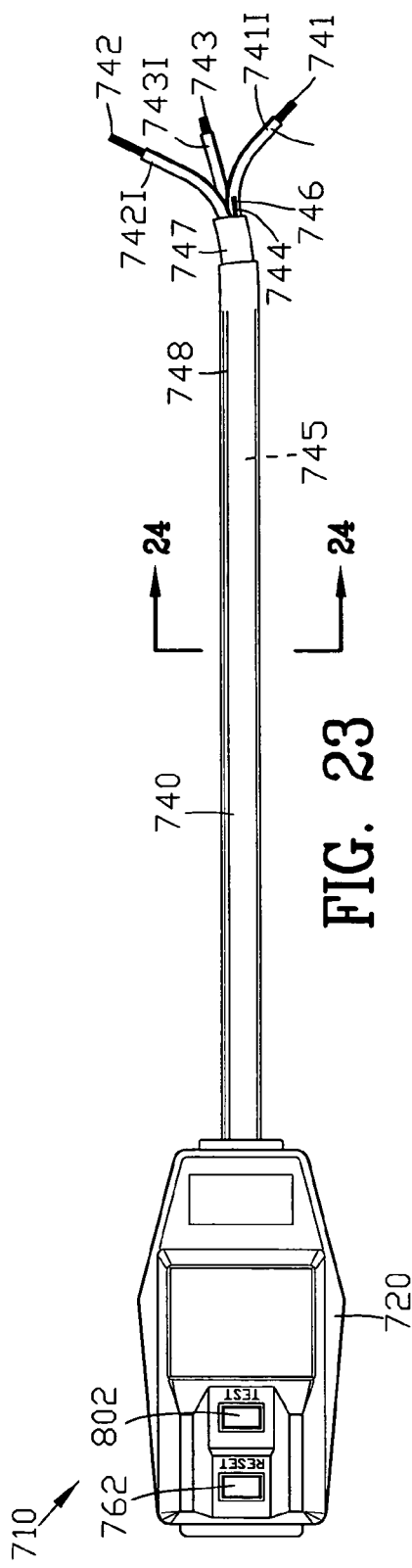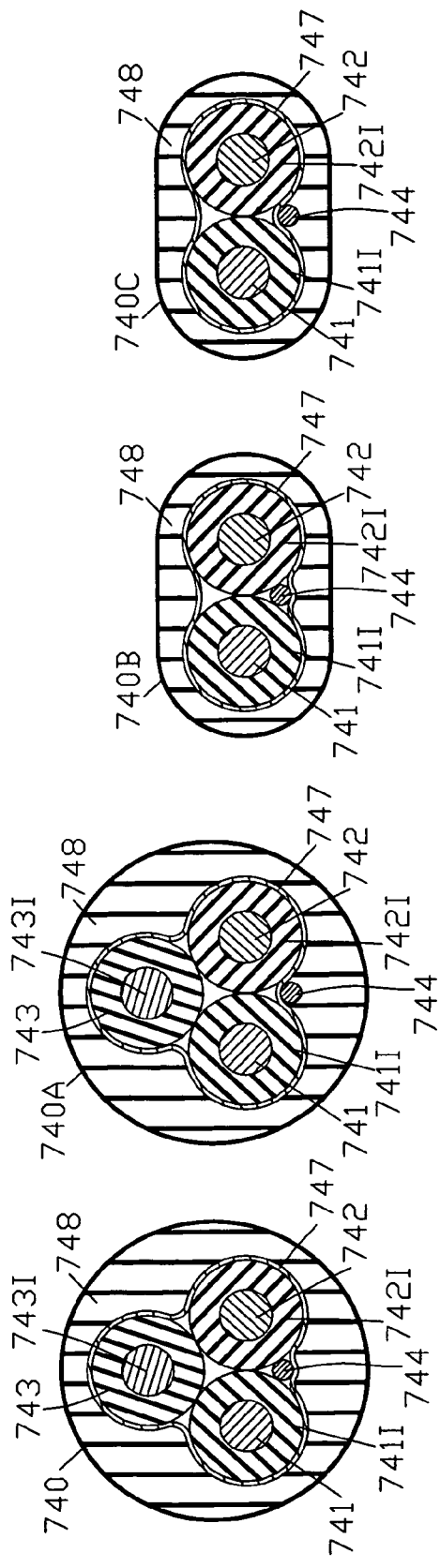

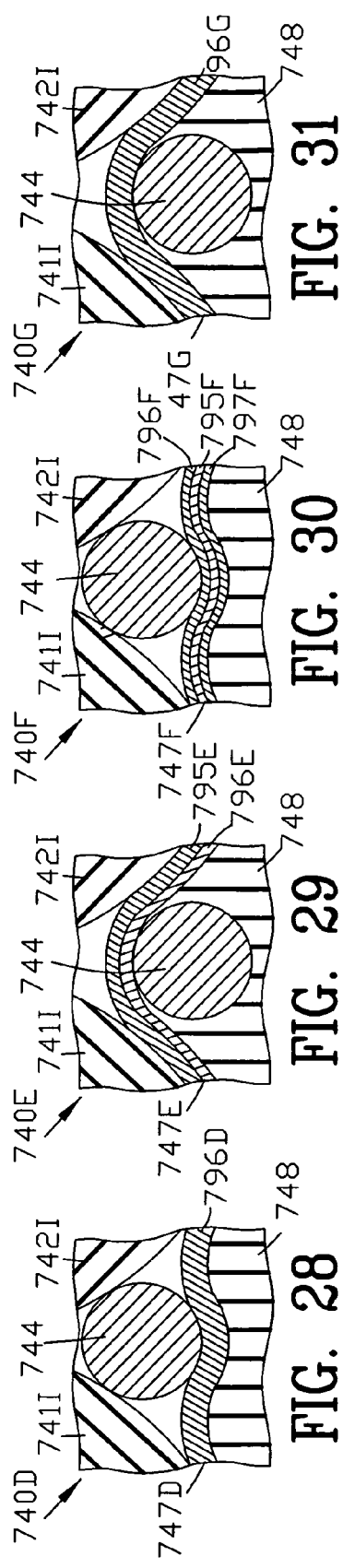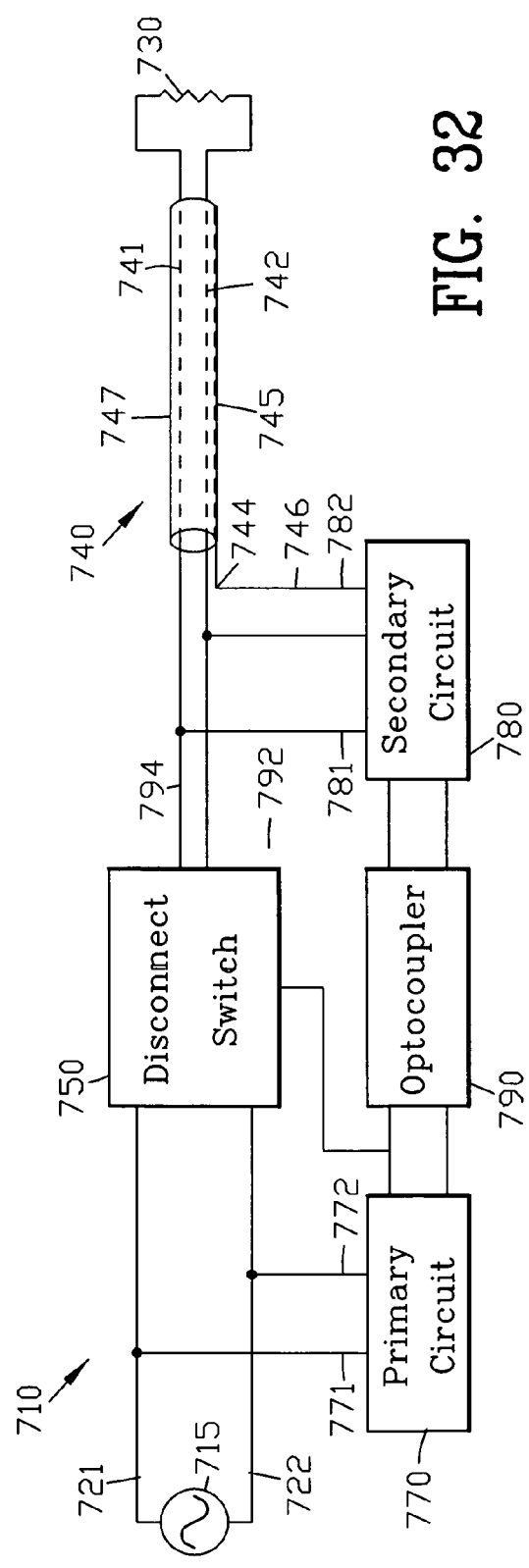

US 8,064,174 B2

LEAKAGE CURRENT DETECTION AND INTERRUPTION CIRCUIT WITH IMPROVED SHIELD

CROSS-REFERENCE TO RELATED APPLICATIONS

This application is a division of application Ser. No. 11/482,251 filed Jul. 7, 2006. Application Ser. No. 11/482, 251 filed Jul. 7, 2006 now U.S. Pat. No. 7,623,329 is a continuation-in-part of U.S. patent application Ser. No. 11/324, 087 filed Dec. 30, 2005 now U.S. Pat. No. 7,751,161. U.S. patent application Ser. No. 11/324,087 filed Dec. 30, 2005 claims benefit of U.S. Patent Provisional application No. 60/641,187 filed Jan. 4, 2005. All subject matter set forth in application Ser. No. 11/482,251 and application Ser. No. 11/324,087 and application No. 60/641,187 is hereby incorporated by reference into the present application as if fully set forth herein.

BACKGROUND OF THE INVENTION

1. Field of the Invention

This invention relates to electrical power circuit and more particularly to a circuit for disconnecting a power source upon the detection of a leakage current.

2. Background of the Invention

Various types of electrical protective devices have been proposed by the prior art for reducing the possibility of dangerous electrical shocks as well as the possibility of electrical fires. One general class of prior art electrical protective devices is a commonly referred to as a ground fault circuit interrupter (GFCI). A ground fault circuit interrupter disconnects a power source upon the detection of an undesired grounding of a power line, such as by a person inadvertently being connected between the power line and a ground. Other types of types of electrical protective devices include appliance leakage current interrupters (ALCIs), equipment leakage current interrupters (ELCIs) and immersion detection circuit interrupters (IDCIs). Underwriters Laboratories, Inc. classifies electrical protective devices as Leakage Current Protection Devices, in Reference Standard UL943A. The following United States patents are representative of leakage current protection devices of the prior art.

U.S. Pat. No. 4,131,927 to Tsuchiya, et al. discloses a current surge, normally associated with the initial application of a nominal A.C. current to an inductive load, for preventing the magnetic core of the inductive load from being driven into saturation. Initially, the current is half wave rectified and amplitude limited. The amplitude limitation insures that the core will not be driven into saturation. A voltage detector connected across the inductive load senses only the counter E.M.F. of a polarity opposite to the polarity of the half wave current. When the sensed voltage reaches a predetermined value, a direct connection is provided between the A.C. supply and the inductive load, bypassing the half wave rectifier and the amplitude limiter.

U.S. Pat. No. 4,352,998 to Baker, et al. discloses a common mode rejection coupler in a power switching system having a variable common mode voltage including a first optical isolator circuit for receiving an input signal and generating in response thereto a first signal which is normally isolated with respect to the common mode voltage. A second optical isolator circuit receives the complement of the input signal and generates a second signal which is also normally isolated with respect to the common mode voltage. The first and second signals are the complement of one another. A comparator receives the first and second signals and generates an output signal which changes state only when the first and second signals complement states. Feedback control circuitry for the comparator is provided for limiting transient changes in one of the first and second signals to prevent the comparator from changing output states when a transient change occurs in one of the first and second signals resulting from a change in the common mode voltage.

U.S. Pat. No. 4,424,544 to Chang, et al. discloses an optically toggled bidirectional normally-on switch with protection against bilateral voltage and bidirectional current surges by the inclusion of a pair of oppositely poled thyristors. One version uses a large junction-type field-effect transistor in its main path and a pair of smaller junction-type transistors in the subsidiary path. A photodiode array controls the gate voltage on each of the transistors and turns them off when illuminated. A control node in the subsidiary path is connected to the gates of the SCRs so that excess current in this path turns on the appropriately-poled thyristor to provide an additional shunt path for the current.

U.S. Pat. No. 4,554,463 to Norbeck, et al. discloses a trigger circuit for gating on a semiconductor switch. The power dissipated in the trigger circuit is minimized by employing a constant current source to provide the gate trigger current. This assures adequate triggering regardless of supply voltage variations or switch intrinsic control voltage requirements. Power is saved by supplying only the current required to drive the semiconductor switch on thereby preventing overdrive. With constant d-c gate current, the precise amount of power needed to turn on and close the switch is provided while wasting relatively little energy due to gate intrinsic voltage variations of the switch or to input line voltage variations.

U.S. Pat. No. 4,717,841 to Dumortier, et al. discloses a static power switch circuit having a power switch member. The static power switch has a bidirectional power switch with at least one controlled semiconductor of the thyristor or triac type with power terminals connected to an AC source in series with a load and a circuit for controlling the power switch member having a first control switch whose current path is connected to the gate of the power semiconductor through a full wave rectifier bridge. This switch is connected to a circuit able to generate control energy of the switch in response to an input signal.

U.S. Pat. No. 5,262,691 to Bailey, et al. discloses an apparatus for responding to a shorted gate in a gate turnoff thyristor. The gate electrode of which is connected by means of a controllable switch to a control voltage terminal having a negative potential with respect to the cathode potential of the thyristor. The controllable switch is arranged to conduct negative gate current in response to a thyristor turnoff command. A voltage comparing means is coupled to the controllable switch for detecting when the switch is conducting negative gate current of relatively high magnitude. Timing means is active for a predetermined interval following the start of the thyristor turnoff command, and logic means is operative to cause the switch to stop conducting negative gate current if the voltage comparing means detects high gate current at the end of such interval.

U.S. Pat. No. 5,365,394 to Ibarguengoitia discloses a protective electronic relay of the type which includes a feed source with a one-phase transformer, rectifying bridge, filter condenser and voltage regulator. Pickups are provided where one-phase signals are generated, connected to some diodes, connected to some capacitors and to a zener diode for the purpose of obtaining rectified, filtered and limited signals with a voltage level proportional to the line intensity of the protected motor. A multiple microswitch connected to some resistors permits presetting of the voltage level and nominal triggering intensity of a relay. An R-C network that can be timed in various scales comprised of resistors a capacitor and another multiple microswitch allows adjustment of the triggering time constant and is applied to that voltage level at the non-inverting input of an operational amplifier whose inverting input is at a reference voltage. Upon the non-inverting input of the operational amplifier reaching the reference voltage, due to a symmetric overload, the output of the operational amplifier passes to logic state 1. This sends a positive signal to the gate of a thyristor, driving it into conduction and depolarizing the base of a transistor making it pass from saturation to cut-off. As a result a relay connected to the collector of the transistor is triggered, changing the state of its contacts and causing disconnection of the protected motor.

U.S. Pat. No. 5,418,678 to McDonald discloses an improved ground fault circuit interrupter (GFCI) device requiring manual setting following initial connection to an AC power source or termination of a power source interruption. The improved GFCI device utilizes a controlled switching device which is responsive to a load power signal for allowing the relay contact sets of the GFCI device to be closed only when power is being made available at the output or load terminals. The controlled switching device preferably comprises an opto-isolator or other type of switching device which provides isolation between the GFCI input and output terminals when the relay contact sets are open. The improved GFCI device may be incorporated into portable units, such as plug-in or line cord units, for use with unprotected AC receptacles.

U.S. Pat. No. 5,459,336 to Kato discloses a semiconductor photocoupler composed of a light emitting element and a light receiving element. Wavelength of emitted light changes as a function of exciting current intensity of the light emitting element, and capacitance of the light receiving element changes as a function of wavelength of receiving light and ceases the capacity change as the receiving light disappears. Signals are transmitted in current-light-capacity type transmission with memory action in the light receiving element.

U.S. Pat. No. 5,463,521 to Love discloses an apparatus for protecting electronic circuit elements from hazardous voltages. The apparatus includes a source of electrical energy that produces electrical energy having a predetermined energy level. An electrical load is connected to the electrical energy source and responsively receives electrical energy. A signaling device receives electrical energy from the electrical energy source and produces an overvoltage signal in response to receiving electrical energy greater than the predetermined energy level. A NMOSFET is connected to the electrical load, and controllably regulates the electrical current flowing through the electrical load. A control device receives the overvoltage signal and responsively controls the operation of the NMOSFET.

U.S. Pat. No. 5,528,445 to Cooke, et al. discloses a fault current protection system for a traction vehicle propulsion system including a synchronous generator having armature and field windings and power conditioning circuitry connecting the generator armature windings to a traction motor employing a normally charged capacitor which, in response to a fault signal resulting from excess current in the generator armature windings, is electrically switched into parallel with the excitation current source connected to the generator field windings so as to discharge through the generator field windings and commutate the excitation current source.

U.S. Pat. No. 5,661,623 to McDonald, et al. discloses a ground fault circuit interrupter (GFCI) line cord plug utilizing an electronically latched relay, rather than a circuit breaker or other type of mechanical latching device, to interrupt the AC load power when a ground fault condition occurs. In order to reduce the size of the relay and minimize the cost and complexity of the GFCI plug, the fixed and movable relay contact structures are mounted directly to the circuit board which carries the remaining components of the GFCI circuit. In a preferred embodiment, the fixed relay contact structures are integral with the plug blades of the GFCI plug. The movable relay contact structures preferably comprise deflectable spring arms which are preloaded when the relay contacts are in the open position in order to control the contact gap, and which are deflected past the point of contact closure when the relay contacts are in the closed position in order to increase the closing force. The principal electrical components of the GFCI plug, including the relay contacts, relay coil and sensing transformer, are mounted on the circuit board in a generally tandem or in-line arrangement in order to minimize the dimensions of the plug.

U.S. Pat. No. 6,002,563 to Esakoff, et al. discloses an improved plug-in power module for providing a controlled amount of electrical power to one or more remote lighting fixtures or other load. The module is configured to sense a ground fault or other current imbalance at the load and, in response, both to trigger the module's circuit breaker to open and to report the occurrence of such a ground fault to a central location. The power module achieves these important functions without adding unduly to the module's complexity or size.

U.S. Pat. No. 6,218,647 to Jones discloses an ice and snow melting system including at least one sensor configured for sensing a temperature or moisture associated with an ambient environment and providing a signal indicative thereof. A heater for melting the ice and snow includes a heater wire, a layer of insulation substantially surrounding the heater wire, and a conductive shield substantially surrounding the layer of insulation. A ground fault circuit interrupter is coupled with the shield of the heater. The ground fault circuit interrupter detects a ground fault condition between the heater wire and the conductive shield and provides a signal indicative thereof. An automatic controller is connected to the at least one sensor. The controller includes heater control circuitry receiving each of the sensor signal and the ground fault circuit interrupter signal. The heater control circuitry selectively controls operation of the heater dependent upon the sensor signal and the ground fault circuit interrupter signal.

U.S. Pat. No. 6,252,365 to Morris, et al. discloses a combination circuit breaker/motor starter including a circuit breaker trip unit having a microprocessor and at least one removably connectable contactor or other functional module. The functional module is encoded with an identifier, such that the microprocessor can determine the type of functional module and appropriate configuration parameters, such as trip times, for the particular application of the functional module. Power is supplied continuously to the trip unit during motor overload or short circuit conditions.

U.S. Pat. No. 6,404,265 to Guido, Jr., et al. discloses a trigger circuit for triggering a silicon device having a control terminal, where the silicon device is subject to variations in the intrinsic control requirements. The trigger circuit comprises a source of direct current (DC) supply voltage, and a DC-to-DC current mode Buck converter for converting the supply voltage into an output DC current not subject to undesired variations due to variations in the supply voltage, the Buck converter supplying to the control terminal a minimum current to turn on the silicon device despite the variations in the intrinsic control requirements. The silicon device may comprise a silicon controlled rectifier (SCR) with a gate terminal, an anode terminal, and a cathode terminal, and wherein the control terminal is the gate terminal, and wherein the variations in the intrinsic control requirements are variations in the intrinsic gate-to-cathode control current and voltage requirements.

U.S. Pat. No. 6,414,829 to Haun, el al. discloses a system for producing a simulated ground fault when arcing is present in an electrical circuit. The system includes a sensor which monitors the electrical circuit. An arcing fault detection circuit determines whether an arcing fault is present in response to the sensor and produces a trip signal in response to a determination that an arcing fault is present in the electrical circuit. A ground fault simulator circuit produces a simulated ground fault in response to the trip signal.

U.S. Pat. No. 6,697,238 and U.S. Patent Application 20020145838 to Bonilla, et al. disclose a GFCI that has secondary test switch contacts. In case closing of the primary test switch contacts fails to trip the GFCI, subsequent closing of the secondary test switch contacts results in a short circuit between the AC input terminals of the GFCI. The short circuit blows a fuse disposed on the line side of the GFCI. The blowing of the fuse disables the GFCI and/or provides an indication to the user that the GFCI is defective.

U.S. Patent Application 20030202310 to George, et al. discloses a method and apparatus for improving the fault protection of a monitor circuit by coupling an input protection circuit to an output section. The input protection circuit may include a fusible device that limits or removes a fault condition present at an input to the input protection circuit. The fusible device may be, for example, a resettable positive temperature coefficient ("PTC") device configured to limit the current passing through it to a predetermined level once it reaches a predetermined temperature. A resistive element may be thermally coupled to the PTC device to assist it reaching the predetermined temperature. The monitor circuit may further be configured to generate a sensory signal in response to a fault condition.

U.S. Patent Application 20040037018 to Kim discloses a GFCI mis-wiring detector including a set of input terminals for an AC source, and a set of output terminals for an AC load. The set of output terminals are conductively connected to the set of input terminals. A GFCI circuit has one or more switches that selectively interrupt the connection between the set of input terminals and the set of output terminals when a ground fault occurs. A mis-wiring detection circuit causes the one or more switches of the GFCI circuit to open when the AC source is electrically coupled to the set of output terminals for a first time interval, even if there is no imbalance in the current flow. Additionally, a suppression circuit suppresses operation of the mis-wiring detection circuit when the AC source is electrically coupled to the input terminals for a second time interval. The second time interval is less than the first time interval.

U.S. Patent Application 20040070895 to Gershen, et al. discloses a SCR, which is used to fire a coil. The coil uses the ground conductor and diodes as the return path to fire the coil to interrupt the voltage from the load. A fully shielded cord is used to detect a break in a conductor. An LED indicator in either the plug or the receptacle of the extension cord verifies that protection is available. A test button is provided to test shield continuity and to verify proper circuit operation.

U.S. Patent Application 20040070899 to Gershen, et al. discloses basic detection and interruption components of an Immersion Detection Circuit Interrupter (IDCI), in combination with the line, neutral and shield conductors of an extension or appliance cord provides a new improved type of detector. A Leakage Current Detector Interrupter (LCDI) interrupts current to a load when current leakage is detected between the line or neutral conductors of the cord and the shield conductor. The new improved LCDI detector provides, either singularly or in combination, the following advantages: prevents the LCDI from being reset should the device become inoperative (reset lockout); provides an indication of the integrity of the shield in the extension or appliance cord; tests the integrity of the shield within the extension or appliance cord, in addition to testing the functionality of the LCDI; interrupts current to the load if an electrical connection is detected between the shield and neutral, or the shield and ground, in addition to the existing detection of leakage current from the phase conductor, allows the LCDI to trip during an open neutral condition by utilizing the ground connection as a return wire for the trip coil; and/or provides immersion detection at the receptacle end of the extension cord in addition to protection from leakage faults.

U.S. Patent Application 20040190686 to Tidwell, et al. discloses an apparatus to determine whether or not protection circuitry for a span-powered remote digital subscriber loop unit is properly connected to earth ground by the deliberate assertion and detection of a ground fault from a central office line card location. The span-powered remote unit is augmented to place a controllable conduction path in circuit with the span-powered loop and an earth ground pin. If the earth ground pin has been properly connected to earth ground, applying the conductive path will place a ground fault on the span, which is detected by a ground fault detector within the central office line card. If the ground fault detector does not detect a ground fault in response to the application of the conductive path, the line card forwards a negative ground fault event message to a test center, so that a service technician may be dispatched to the remote unit to correct the problem.

Therefore, it is an object of the present invention to provide a circuit for disconnecting a power source upon the detection of a leakage current that provides a significant improvement in the electrical art.

Another object of this invention is to provide a further alternate embodiment from the inventions disclosed in my prior pending patent applications set forth in the cross reference to related applications.

Another object of this invention is to provide a circuit for disconnecting a power source upon the detection of a leakage current that completely isolates the power source upon the detection of a leakage current.

Another object of this invention is to provide a circuit for disconnecting a power source upon the detection of a leakage current that utilizes an optocoupler for completely isolating the power source upon the detection of a leakage current.

Another object of this invention is to provide a circuit for disconnecting a power source upon the detection of a leakage current that requires a reduced number of electrical components.

Another object of this invention is to provide a circuit for disconnecting a power source upon the detection of a leakage current that incorporates an improved conductive shield for the detection of a leakage current.

Another object of this invention is to provide a circuit for disconnecting a power source upon the detection of a leakage current that is more economical than similar units of the prior art.

Another object of this invention is to provide a circuit for disconnecting a power source upon the detection of a leakage current that may be incorporated into existing line cord packages.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to a circuit is disclosed for disconnecting a power source upon the detection of a leakage current comprising a power cable having an insulated first wire and an insulated second wire. The power cable has a conductive shield surrounding the insulated first wire and the insulated second wire with a drain wire being in contact with the electrical conductive shield. A disconnect switch is interposed between the power source and the power cable with a primary circuit controlling the disconnect switch. A secondary circuit is connected to the drain wire for sensing a leakage current between the conductive shield and one of the insulated first wire and the insulated second wire. An optical switch interconnects the primary circuit and the secondary circuit for opening the disconnect switch upon the secondary circuit sensing a leakage current.

In a more specific embodiment of the invention, the conductive shield may be a metallic foil such as an aluminum foil or may be a metallic mesh. In one example, the drain wire has a first and a second portion with the first portion of the drain wire being non-insulated and in contact with the conductive shield. Preferably, the first portion of the drain wire extends along substantially the total length of the conductive shield. In one example, the drain wire is located internal to the conductive shield. In an alternate example, the drain wire is located external to the conductive shield. The outer insulating layer of the power cable establishes a mechanical engagement between the first portion of the drain wire and the conductive shield to provide an electrical connection between the drain wire and the conductive shield.

In one example of the invention, the disconnect switch includes a solenoid operated switch. Preferably, the disconnect switch includes a normally closed solenoid operated switch and a latch for maintaining the disconnect switch in an open condition upon the secondary circuit sensing a leakage current from the wire. In a specific example, the latch comprises a mechanical latch mechanism for maintaining the disconnect switch in an open condition upon the secondary circuit sensing a leakage current from the wire.

In another example of the invention, the secondary circuit includes a light emitting device connected to the drain wire for sensing a leakage current between the conductive shield and one of the insulated first wire and the insulated second wire. The light emitting device senses a leakage current between the wire and the shield sensing conductor.

The optical switch includes a light emitting device optically coupled to a photoconductive switch for completely electrically isolating the power source upon the opening of the disconnect switch. The optical switch includes a light emitting device electrically connected to the secondary circuit for sensing a leakage current between the conductive shield and one of the insulated first wire and the insulated second wire. A photoconductive switch is connected to the primary circuit for controlling the disconnect switch. The light emitting device is optically coupled to a photoconductive switch for electrically isolating the primary circuit from secondary circuit. In one example of the invention, the optical switch includes an optocoupler switch having a light emitting device optically coupled to a photoconductive switch.

The circuit may be included with a housing molded from a polymeric material. In one example, the housing has a first and a second lug for insertion within a first and a second socket. The power cable extends from the housing.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

BRIEF DESCRIPTION OF THE DRAWINGS

For a fuller understanding of the nature and objects of the invention, reference should be made to the following detailed description taken in connection with the accompanying drawings in which:

FIG. 18 is a circuit diagram of a third embodiment of the circuit of FIG. 14;

FIG. 19 is a circuit diagram of a fourth embodiment of the circuit of FIG. 14;

FIG. 23 is a view of the electrical plug housing shown in FIGS. 1-3 with an alternate power cable extending from the housing;

FIG. 24 is an enlarged sectional view along line 2424 in FIG. 23 of the power cable illustrating a first and a second wire, a ground wire and the drain wire located within a conductive shield;

FIG. 25 is a view similar to FIG. 24 of a power cable with the drain wire located outside of the conductive shield;

FIG. 26 is a view similar to FIG. 24 of an alternate embodiment of a power cable illustrating a first and a second wire with a drain wire located within the conductive shield;

FIG. 27 is a view similar to FIG. 26 of a power cable with the drain wire located outside of the conductive shield;

FIG. 28 is a first example of a conductive shield suitable for use in present invention;

FIG. 29 is a second example of a conductive shield suitable for use in present invention;

FIG. 30 is a third example of a conductive shield suitable for use in present invention;

FIG. 31 is a fourth example of a conductive shield suitable for use in present invention;

FIG. 32 is a block diagram of an eighth embodiment of the present invention.

Similar reference characters refer to similar parts throughout the several Figures of the drawings.

DETAILED DISCUSSION

Figures 1, 2, 3:
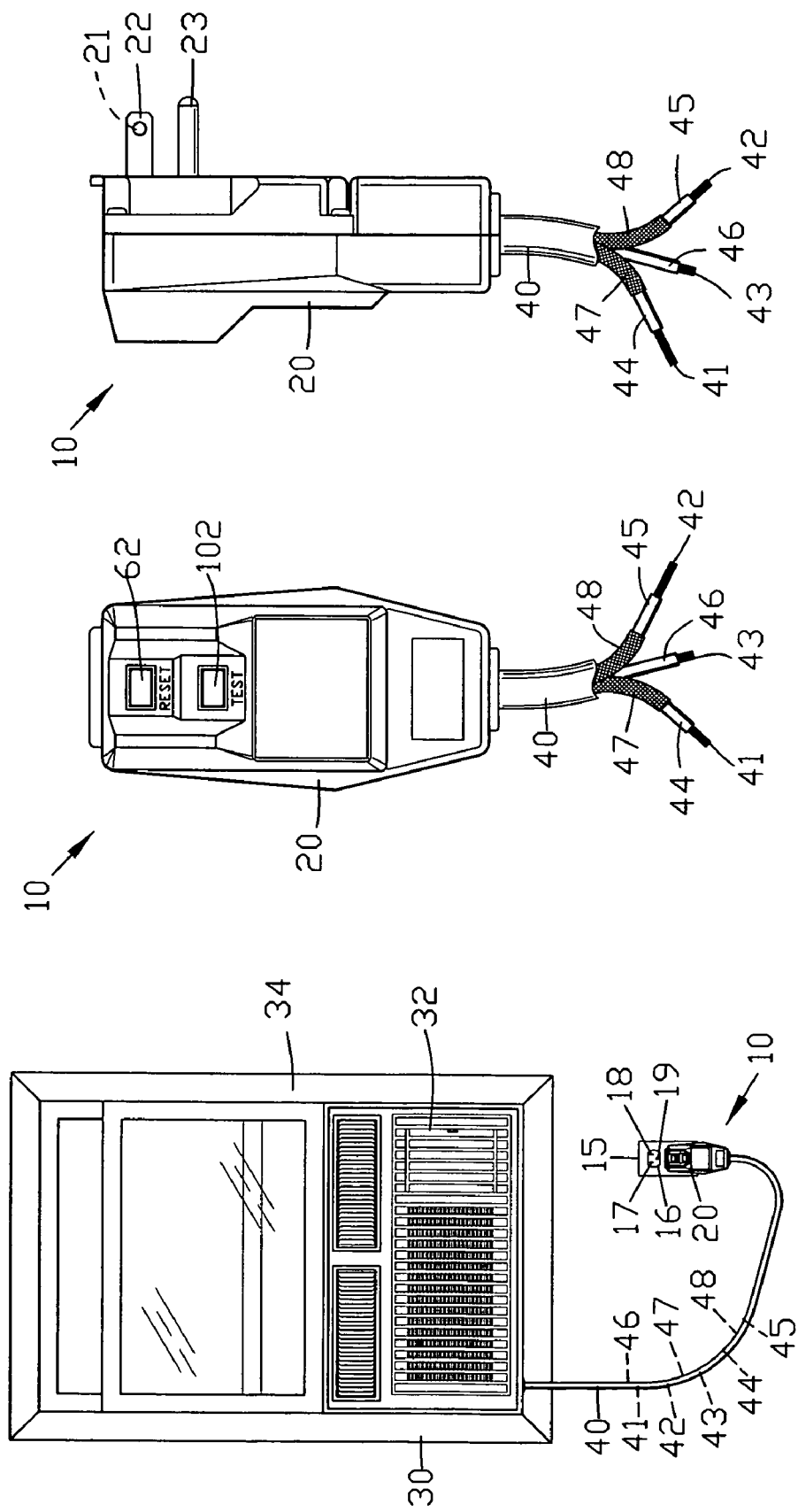
FIG. 1 is an elevational view of the circuit of the present invention connecting a power source to a load shown as an air conditioning unit.
FIG. 2 is an enlarged view of the a portion of FIG. 1 illustrating an electrical plug housing the circuit of the present invention.
FIG. 3 is a side view of FIG. 2.

FIG. 1 is an elevational view of the circuit 10 of the present invention for disconnecting a power source 15 upon the detection of a leakage current. In this example, the power source 15 is shown as a conventional electrical receptacle 16. The conventional electrical receptacle 16 has a line socket 17, a neutral socket 18 and a ground socket 19.

The circuit 10 is contained within a housing 20 in the form of an electrical plug adapted for insertion within the conventional electrical receptacle 16. A load 30 is shown as an air conditioning unit 32 installed in a window 34. A wire assembly 40 connects the circuit 10 within the housing 20 to the load 30.

FIGS. 2 and 3 are enlarged views of a portion of FIG. 1 further illustrating the circuit 10 contained within the housing 20. The housing 20 supports a line lug 21, a neutral lug 22 and a ground lug 23. The lugs 21-23 of the housing are adapted to be inserted into the sockets 17-19 of the receptacle 16. Preferably, the housing 20 is formed from a molded polymeric material.

The circuit 10 connects the electrical lugs 21-23 to the wire assembly 40 comprising a first and a second wire 41 and 42 and a grounding wire 43. A first and a second insulation 44 and 45 surround the first and second wires 41 and 42 whereas insulation 46 surrounds the grounding wire 43 in a conventional fashion.

A first and a second shield 47 and 48 surround the first and second the first and second wires 41 and 42. As will be described in greater detail hereinafter, the circuit 10 disconnects the power source 15 from the load 30 upon the detection of a leakage current from any one of the first and second wires 41 and 42 and the first and second shields 47 and 48. In addition, the circuit 10 disconnects the power source 15 from the load 30 upon the detection of a leakage current from the grounding wire 43 to either one of the first and second shields 47 and 48. In the alternative, a conventional non-insulated wire (not shown) may extend along the first and second wires 41 and 42 and the grounding wire 43 as a sensor wire for detecting a leakage current from the either one of the first and second wires 41 and 42 and/or the grounding wire 43.

Figure 4:
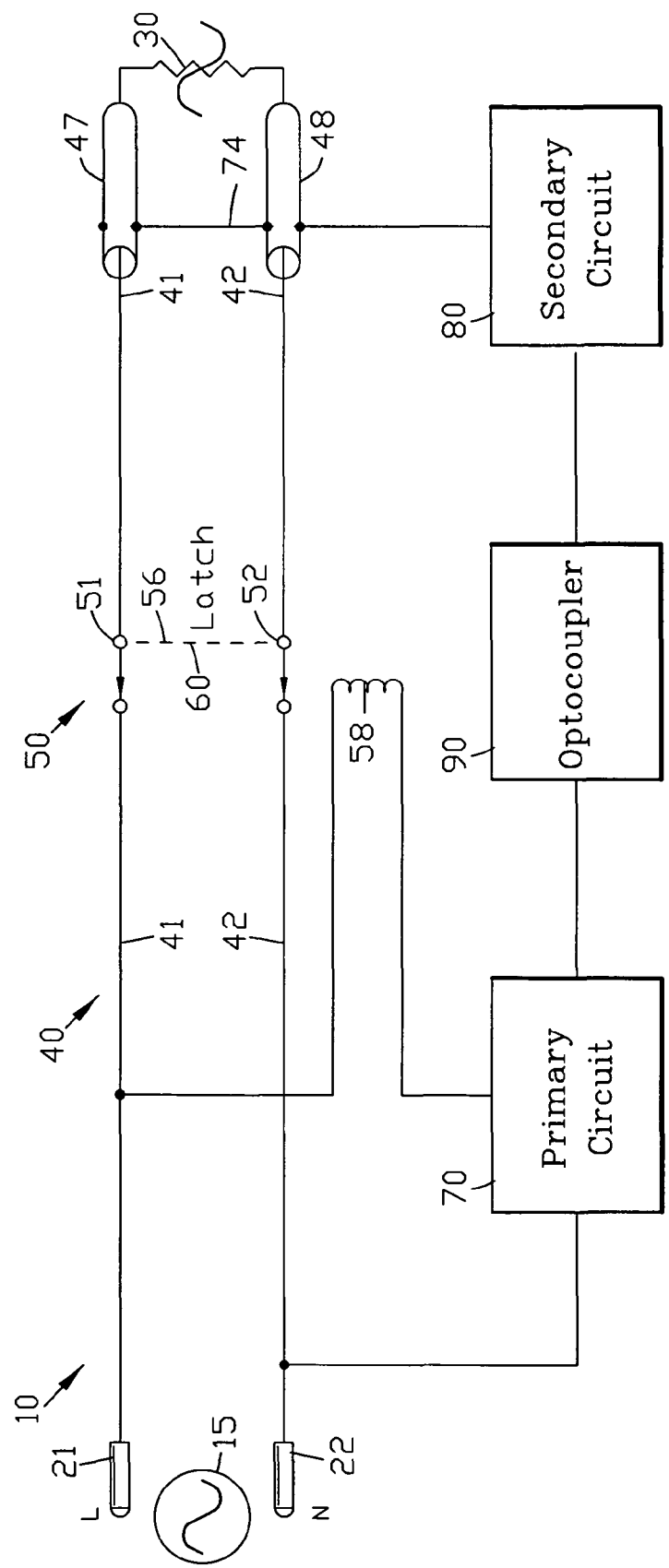
FIG. 4 is a block diagram of the circuit of the present invention for disconnecting an electrical power source upon the detection of a leakage current.

FIG. 4 is a block diagram of the circuit 10 of the present invention for disconnecting an electrical power source 15 from the load 30 upon the detection of a leakage current within the wire assembly 40. In this example, the electrical power source 15 is shown as a conventional 110 volt alternating current (AC) power source. The first terminal 21 is the line terminal whereas the second terminal 22 is the neutral terminal. Although the electrical power source 15 has been shown as conventional 110 volt alternating current (AC) power source, it should be appreciated by those skilled in the art that the present invention may be adapted to virtually any type of power source.

The circuit 10 comprises a disconnect switch 50 interposed within the first and second wires 41 and 42 for disconnecting the power source 15 from the load 30. In this example, a latch 60 cooperates with the disconnect switch 50 as will be described in greater detail hereinafter.

A primary circuit 70 is connected to the disconnect switch 50 for controlling the disconnect switch 50. The primary circuit 70 opens the disconnect switch 50 upon the secondary circuit 80 sensing at leakage current from one of the first and second wires 41 and 42.

A secondary circuit 80 is located between the disconnect switch 50 and the load 30 for sensing a leakage current between the one of the first and second wires 41 and 42 and the first and second shields 47 and 48. In addition, the secondary circuit 80 senses a leakage current between the grounding wire 43 shown in FIGS. 2 and 3 and one of the first and second shields 47 and 48.

The first and second shields 47 and 48 function as shield sensing conductors for enabling the secondary circuit 80 for sensing a leakage current between the one of the first and second wires 41 and 42 and the first and second shields 47 and 48. In the alternative, a single non-insulated wire may be provided as a sensing conductor as shown in FIG. 18 for sensing a leakage current from either one of the first and second wires 41 and 42.

An optical switch 90 interconnects the primary circuit 70 and the secondary circuit 80 for opening the disconnect switch 50 upon the secondary circuit 80 sensing a leakage current within the wire assembly 40 for completely electrically disconnecting the power source 15 from the load 30 and completely electrically disconnecting the primary circuit 70 and the secondary circuit 80.

Figure 5:
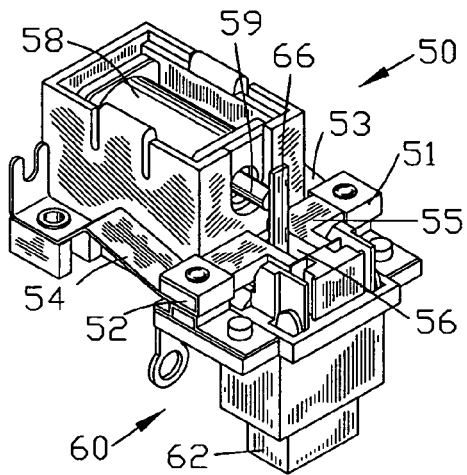
FIG. 5 is an isometric view of a disconnect switch in a closed position.
Figure 6:
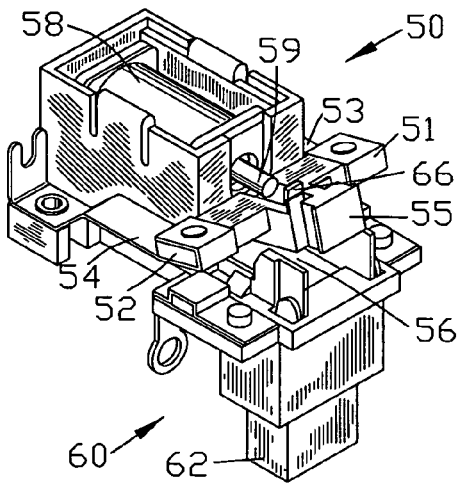
FIG. 6 is an isometric view of the disconnect switch of FIG. 5 in an open position.

FIGS. 5 and 6 are isometric views of an example of the disconnect switch 50 of FIG. 4 shown in a closed and an open position, respectively. In this example, the disconnect switch 50 comprises a first and a second switch 51 and 52 shown as resilient relay contacts 51 and 52 mounted on resilient metallic conductors 53 and 54. The resilient metallic conductors 53 and 54 bias the first and second switches 51 and 52 into an open position.

FIGS. 7-11 illustrate various positions of the operation of the disconnect switch 50 and the latch 60. An insulating switch operator 55 interconnects the first and second switches 51 and 52 for moving the first and second switches 51 and 52 in unison. The insulating switch operator 55 includes an aperture 56 defining a shoulder 57. The disconnect switch 50 includes a solenoid coil 58 for operating a plunger 59. The plunger 50 is located for movement adjacent to the aperture 56 in the insulating switch operator 55.

In this example, the latch 60 is shown as a mechanical latch comprising a reset button 62 having a return spring 64. The resent button 62 extends from the housing 20 as shown in FIGS. 1 and 2. A latch bar 66 having a latch shoulder 68 is connected to the reset button 62.

Figure 7:
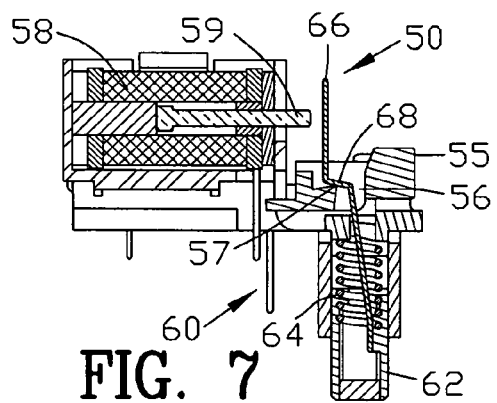
FIG. 7 is a side sectional view of the disconnect switch of FIG. 5 in the closed position.
Figure 7A:
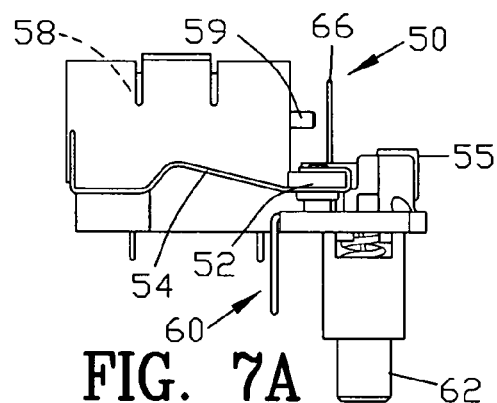
FIG. 7A is a side view of the disconnect switch shown in FIG. 7.

FIGS. 7 and 7A illustrate the disconnect switch 50 of FIG. 5 in the closed position. The latch shoulder 68 of the latch bar 66 engages with the shoulder 57 defined by the aperture of the switch operator 55. The return spring 64 is selected to be stronger than the resilient metallic conductors 53 and 54 biasing the first and second switches 51 and 52 into an open position. The return spring 64 retains the first and second switches 51 and 52 in the closed position against the urging of the resilient metallic conductors 53 and 54.

Figure 8:
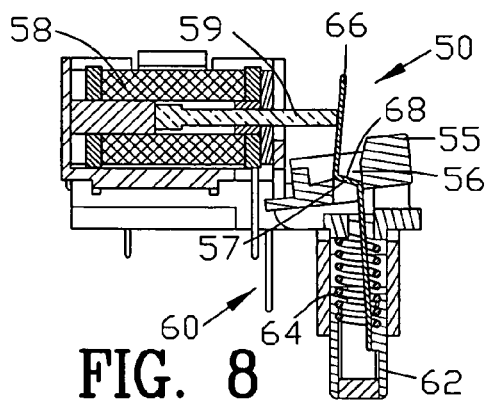
FIG. 8 is a side sectional view of the disconnect switch of FIG. 5 in a partially open position.
Figure 8A:
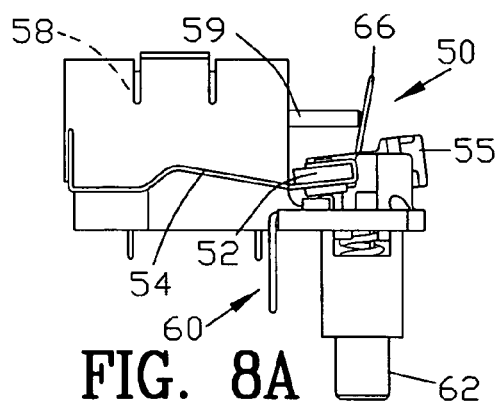
FIG. 8A is a side view of the disconnect switch shown in FIG. 8.

FIGS. 8 and 8A illustrate the disconnect switch 50 in a partially open position. An electrical current through the solenoid coil 58 extends the plunger 59 to displace the latch bar 66. The plunger 59 displaces the latch bar 66 to disengage the latch shoulder 68 of the latch bar 66 from the shoulder 57 of the switch operator 55. The disengagement of the latch shoulder 68 from the shoulder 57 permits the resilient metallic conductors 53 and 54 to bias the first and second switches 51 and 52 into the open position.

Figure 9:
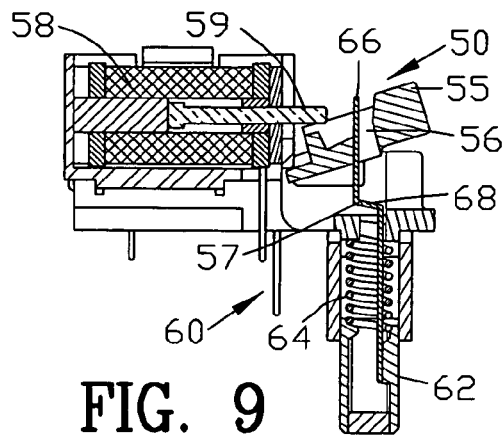
FIG. 9 is a side sectional view of the disconnect switch of FIG. 5 in a fully open position.
Figure 9A:
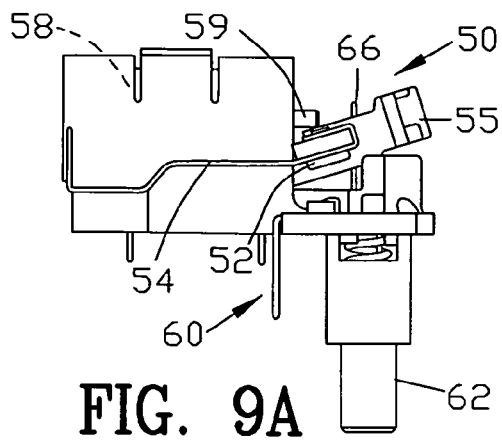
FIG. 9A is a side view of the disconnect switch shown in FIG. 9.

FIGS. 9 and 9A is a side sectional view of the disconnect switch 50 in a fully open position. The resilient metallic conductors 53 and 54 urge the first and second switches 51 and 52 into the open position. The first and second switches 51 and 52 remains in the open position until the disconnect switch 50 is manually reset.

Concomitantly therewith, the return spring 64 moves the reset button 62 into an extended position. The resent button 62 extends from the housing 20 as shown in FIGS. 1 and 2. The latch bar 66 and the latch shoulder 68 move in unison with the reset button 62.

Figure 10:
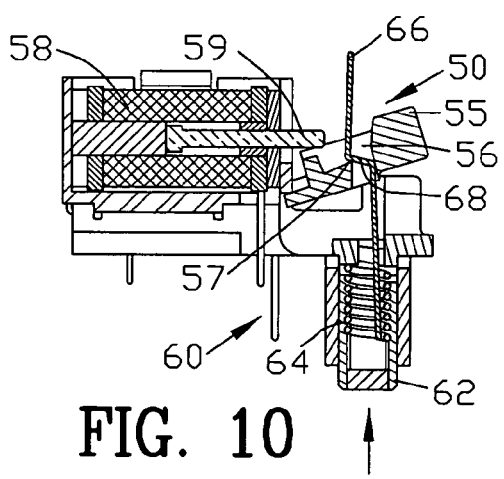
FIG. 10 is a side sectional view of the disconnect switch of FIG. 5 illustrating the reset of the latch relay with the latch being in the open position.
Figure 10A:
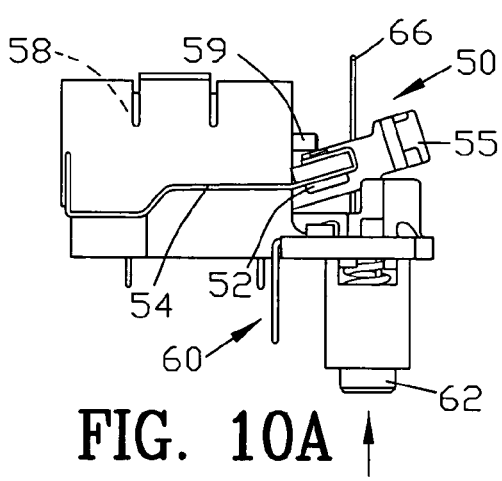
FIG. 10A is a side view of the disconnect switch shown in FIG. 10.

FIGS. 10 and 10A illustrate the movement of the reset button 62 by an operator to reset the disconnect switch 50. The reset button 62 is depressed against the urging of the return spring 64. The latch shoulder 68 of the latch bar 66 reengages with the shoulder 57 of the switch operator 55.

Figure 11:
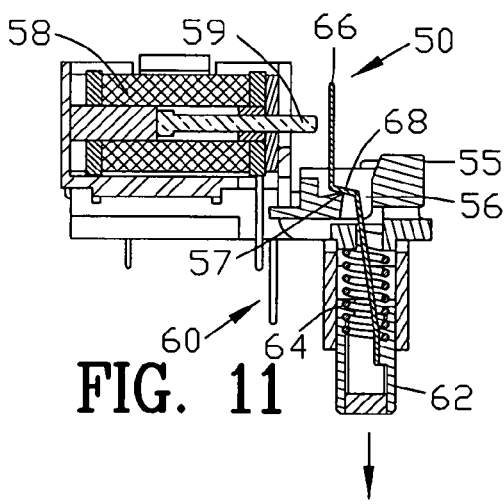
FIG. 11 is a side sectional view of the disconnect switch of FIG. 5 illustrating the latch relay reset into the closed position.
Figure 11A:
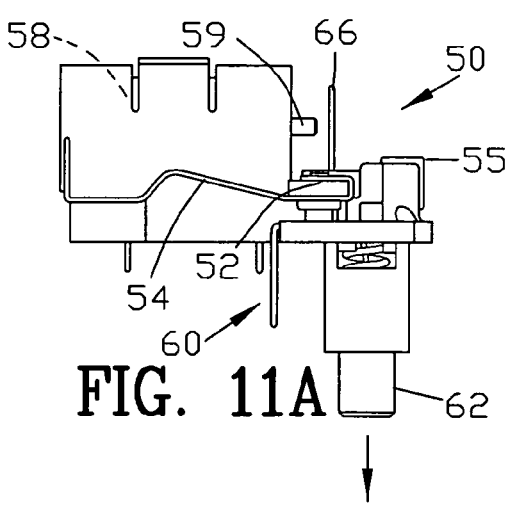
FIG. 11A is a side view of the disconnect switch shown in FIG. 11.

FIGS. 11 and 11A illustrate the fully reset disconnect switch 50. The return spring 64 moves the first and second switches 51 and 52 into the closed position against the urging of the urging of the resilient metallic conductors 53 and 54.

Although the disconnect switch 50 has been shown as a normally open, latch closed solenoid mechanism, it should be appreciated by those skilled in the art that various types of mechanical and or electrical switches may be utilized within the present invention for providing the structure and function of the disconnect switch 50.

Figure 12:
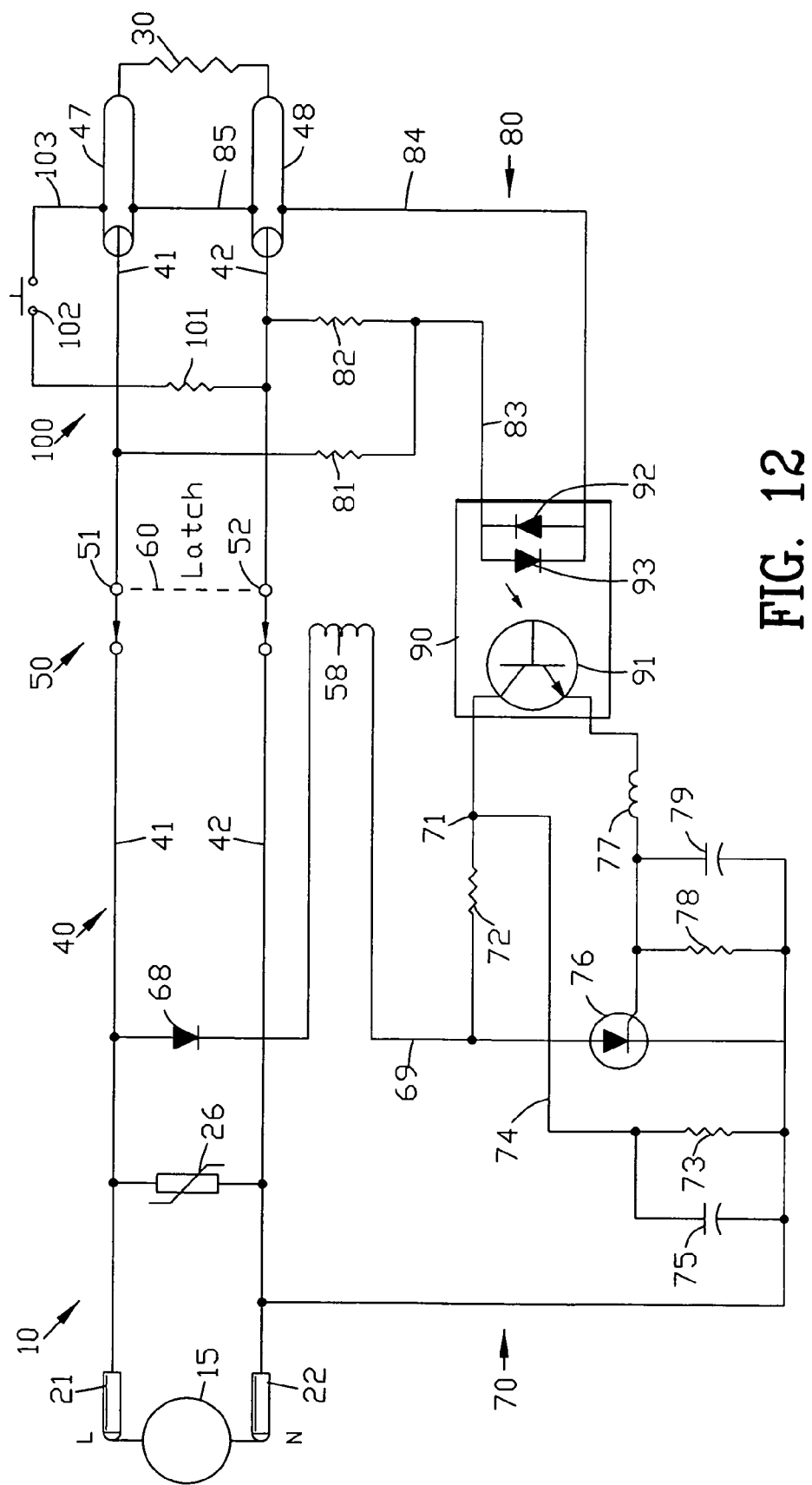
FIG. 12 is a circuit diagram of a first embodiment of the circuit of FIG. 4.

FIG. 12 is a circuit diagram of a first embodiment of the circuit 10 of FIG. 4. The first and second terminals 21 and 22 extending from the housing 20 are connected to the wires 41 and 42 of the wire assembly 40. A surge suppressor shown as a metal oxide varistor 26 is connected across the first and second wires 41 and 42. The function and operation of the metal oxide varistor 26 should be well known to those skilled in the art.

The disconnect 50 is interposed within the wire assembly 40 with the first and second switches 51 and 52 located within the first and second wires 41 and 42. The disconnect switch 50 is shown in the closed or reset condition.

The primary circuit 70 is located on a primary side of the disconnect switch 50 for controlling the disconnect switch 50. The primary circuit 70 opens the disconnect switch 50 upon the secondary circuit 80 sensing a leakage current from one of the wire 41 and 42. The disconnect switch 50 is controlled through the solenoid coil 58 by the primary circuit 70. A diode 68 providing power through the solenoid coil 58 of the disconnect switch 50 to a conductor 69 to power the primary circuit 70. The solenoid coil 58 is connected to a voltage divider network 71 comprising resistor 72 and resistor 73. A capacitor 75 is connected across the resistor 73 of the voltage divider network 71. The conductor 69 is connected to a switch shown as a thyristor or silicon controlled rectifier 76.

The voltage divider network 71 is connected to the collector of the phototransistor 91 of the optocoupler 90. A coil 77 connects the emitter of phototransistor 91 to the gate of the thyristor 76. A pull down resistor 78 and a capacitor 79 are connected to the gate of the thyristor 76.

The secondary circuit 80 comprises resistor 81 and 82 forming a voltage divider network 83. The voltage divider network 83 is connected to light emitting diodes 92 and 93 within the optocoupler 90. A connector 84 connects the light emitting diodes 92 and 93 to the shield 48 surrounding the second wires 42. A connector 85 connects the shield 48 surrounding the second wire 42 to the shield 47 surrounding the first second wire 41.

An optional test circuit 100 may be included for testing the circuit 10. The optional test circuit 100 comprises resistor 101 connected to the wire 42 of the wire assembly 40. A momentary switch 102 connects the resistor 101 to the shield 47 surrounding the first second wire 41 through a conductor 103.

Figure 13:
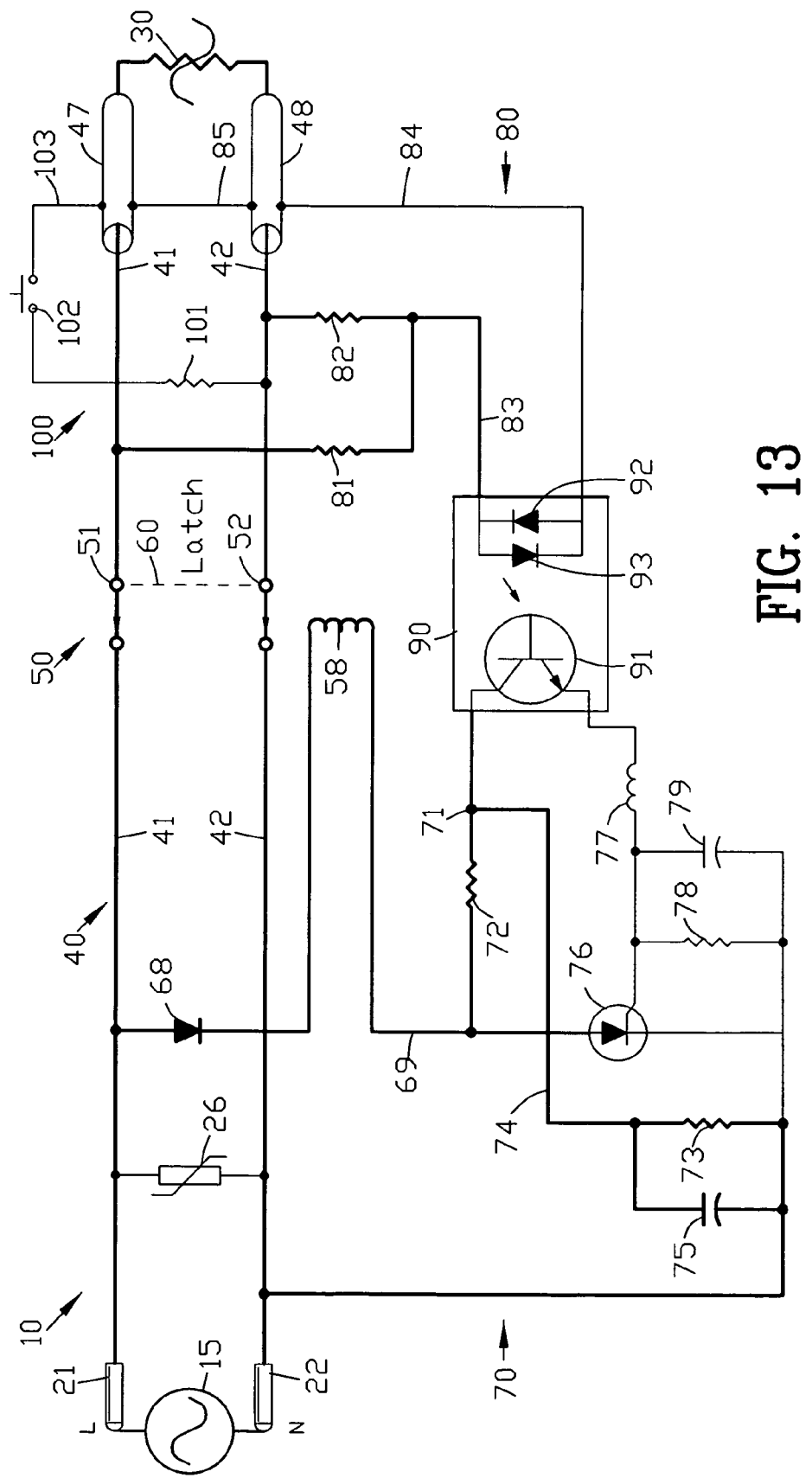
FIG. 13 is the circuit diagram of FIG. 12 connected to the circuit to the power source.

FIG. 13 is a diagram of the circuit 10 of FIG. 12 connected to the power source 15. Power is applied to the circuit 10 by inserting the first and second terminals 21 and 22 extending from the housing 20 into the electrical receptacle 17 shown in FIG. 1. Upon the application of power, conventional current flows from diode 68 through the solenoid coil 58 to the voltage divider network 71. The diode 68 in combination with solenoid coil 58 provides a direct current (DC) voltage for the primary circuit 70.

The conductor 69 applies power to the voltage divider network 71 and to the anode of the thyristor 76. The capacitor 75 assists in reducing alternating current (AC) voltage ripple within the voltage divider network 71. The voltage divider network 71 provides operating voltage to the collector of phototransistor 91. The total resistance of resistors 72 and 73 of the voltage divider network 71 is selected to establish a minor conventional current flow through the solenoid coil 58. The minor voltage through the solenoid coil 58 is insufficient to actuate the disconnect switch 50.

The voltage divider circuit 83 of the secondary circuit 80 provides operating voltage to the light emitting diodes 92 and 93. The light emitting diodes 92 and 93 are connected through conductor 84 to the shield 48 surrounding the second wire 42 and connected through conductor 85 to the shield 47 surrounding the first wire 41.

In the absence of a leakage current between the first wire 41 and the surrounding shield 47 and the absence of a leakage current between the second wire 42 and the surrounding shield 48, the light emitting diodes 92 and 93 will not illuminate the phototransistor 91 of the optocoupler 90. The absence of illumination of the phototransistor 91 will keep the gate of the thyristor 76 in a low voltage condition. The pull down resistor 78 and capacitor 79 in combination with the coil 77 prevents inadvertent actuation of the thyristor 76 by electrical transients. As long as thyristor 76 is in a non-conductive condition, the disconnect switch 50 remains in the closed or reset condition.

Figure 14:
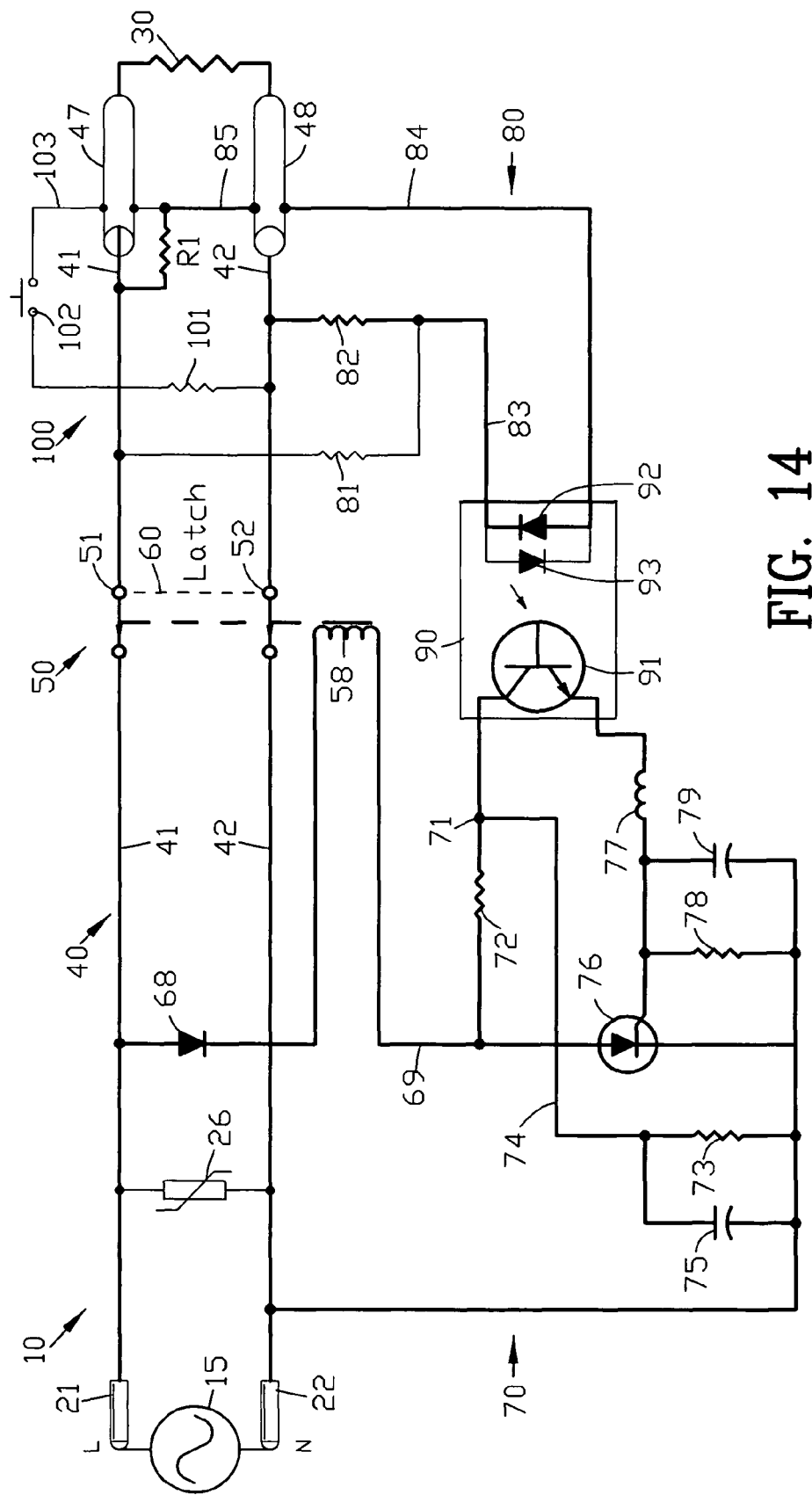
FIG. 14 is the circuit diagram similar to FIG. 13 illustrating the detection of a leakage current by the circuit.

FIG. 14 is the circuit 10 of FIG. 13 with a leakage current R1 established between the first wire 41 and the shield 47. Preferably, the voltage divider circuit 83 establishes a threshold for the leakage current R1 to be less than 0.001 amperes but it should be understood that the threshold for the leakage current R1 may be established at any suitable value. When a positive half-cycle of AC voltage is present on the first wire 41, conventional current flows from the first wire 41 through the leakage resistor R1 through light emitting diode 92 to the voltage divider circuit 83. When a negative half-cycle of AC voltage is present on the first wire 41, conventional current flows from the voltage divider circuit 83 through light emitting diode 93 to the first wire 41 through the leakage resistor R1.

If a leakage current (not shown) develops between the second wire 42 and the shield 48, the circuit 10 undergoes the following current flows. When a positive half-cycle of AC voltage is present on the first wire 41, conventional current flows from the voltage divider circuit 83 through light emitting diode 93 to the second wire 42 through the leakage resistor R. When a negative half-cycle of AC voltage is present on the first wire 41, conventional current flows from the second wire 42 through the leakage resistor R through light emitting diode 92 to the voltage divider circuit 83.

The leakage current between the first wire 41 and the shield 47 is conducted through one of the light emitting diodes 93 and 94. The conduction of the leakage current through one of the light emitting diodes 93 and 94 illuminates the phototransistor 91. Upon illumination, of the phototransistor 91, phototransistor 91 conducts conventional current from the collector to the emitter. Upon the conduction of the phototransistor 91, the charge on capacitor 75 flows through phototransistor 91 raising the voltage on the gate of the thyristor 76 to institute conduction of the thyristor 76. The conduction of the thyristor 76 results in a major conventional current flow through the solenoid coil 58. The major conventional current flow through the solenoid coil 58 actuates the plunger 59 to open the disconnect switch 50 as shown in FIG. 9.

Figure 15:
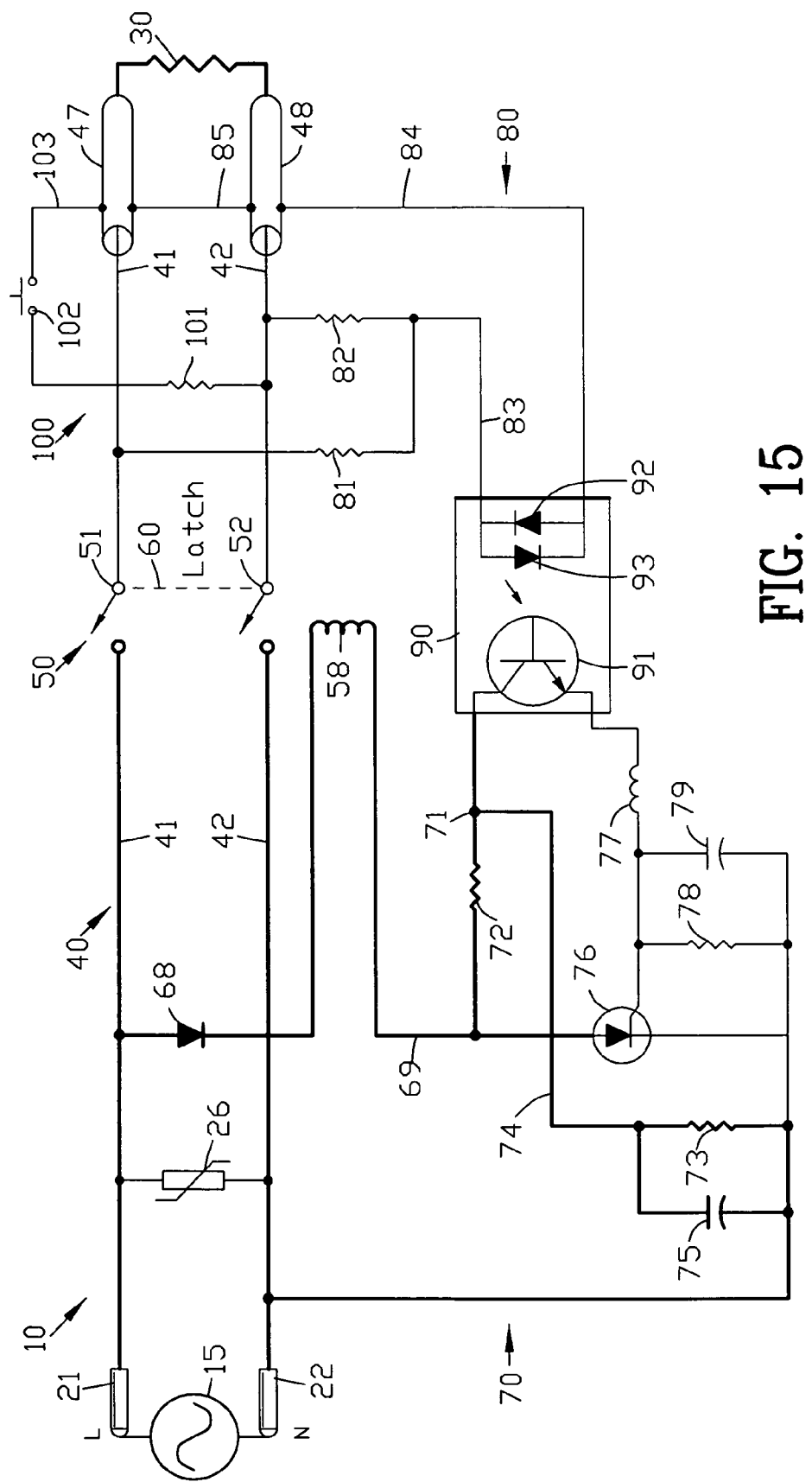
FIG. 15 is the circuit diagram similar to FIG. 12 illustrating the disconnection of the power source from the load.

FIG. 15 is the circuit 10 of FIG. 14 illustrating the disconnection of the power source 15 from the load 30 upon the opening of the disconnect switch 50. The opening of the disconnect switch 50 completely isolates the power source 15 from the load 30. The optical coupling between the phototransistor 91 and the light emitting diodes 82 and 93 completely electrically isolates the primary circuit 70 from the secondary circuit 80.

Figure 16:
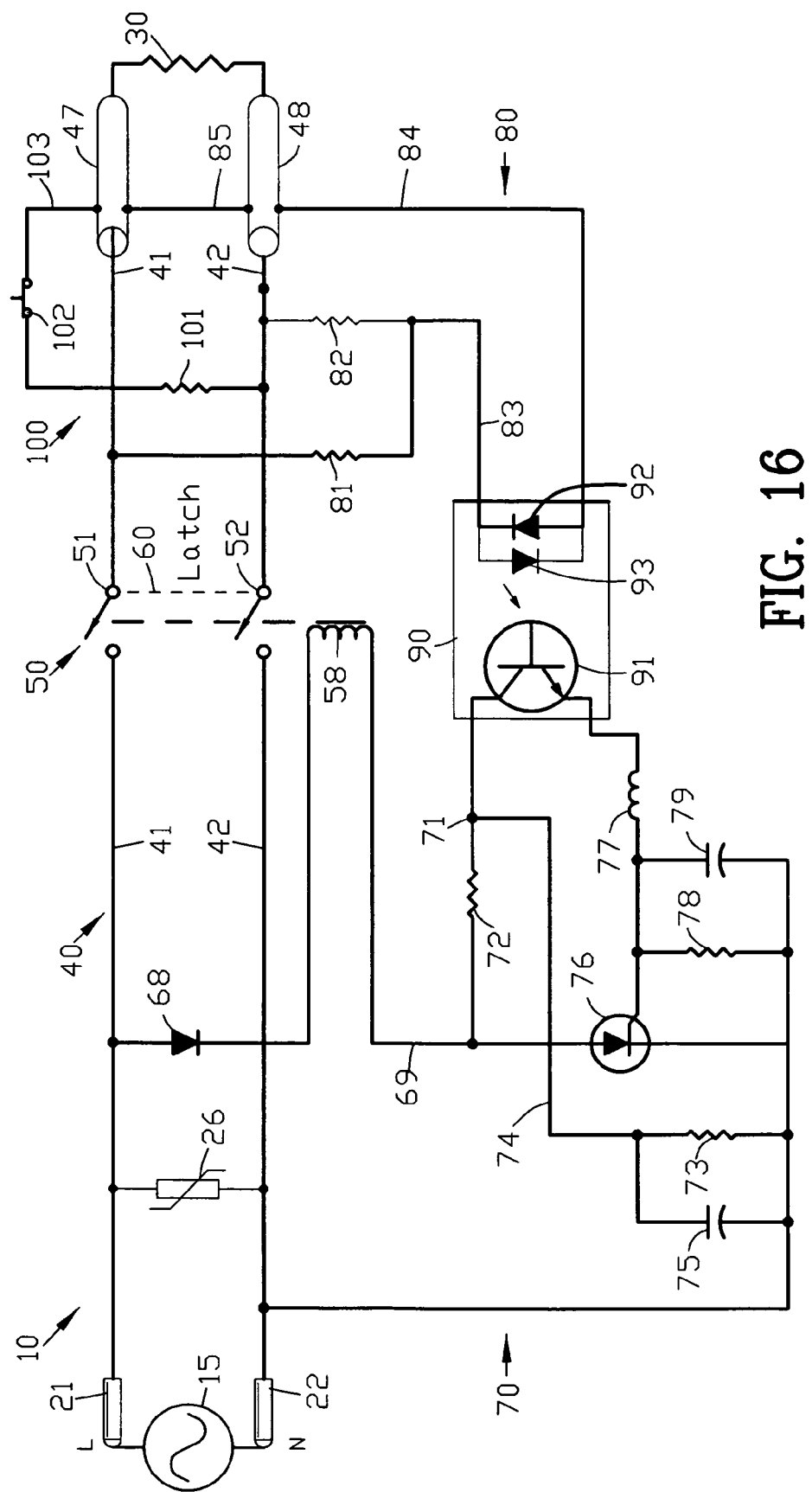
FIG. 16 is the circuit diagram similar to FIG. 12 illustrating the operation of a test circuit.

FIG. 16 is the circuit 10 of FIG. 12 illustrating the operation of the optional test circuit 100. A momentary depression of momentary switch 102 causes conventional current flow to flow from the second wire 42 through resistor 101 and conductor 103 to the shield 47. Since the shield numeral 47 is connected to the shield 48 by the connector 85, the closing of the switch 102 creates a current between the second wire 42 and the shield 48.

The current between the second wire 42 and the shield 48 is conducted through the one of the light emitting diodes 92 and 93 to illuminate the phototransistor 91. The conduction of phototransistor 91 institutes conduction of the thyristor 76 resulting in a major conventional current flow through the solenoid coil 58. The major conventional current flow through the solenoid coil 58 actuates the plunger 59 to open the disconnect switch 50 as shown in FIG. 9. The circuit 10 may be return to closed and reset position by the depression of the reset button 82.

Figure 17:
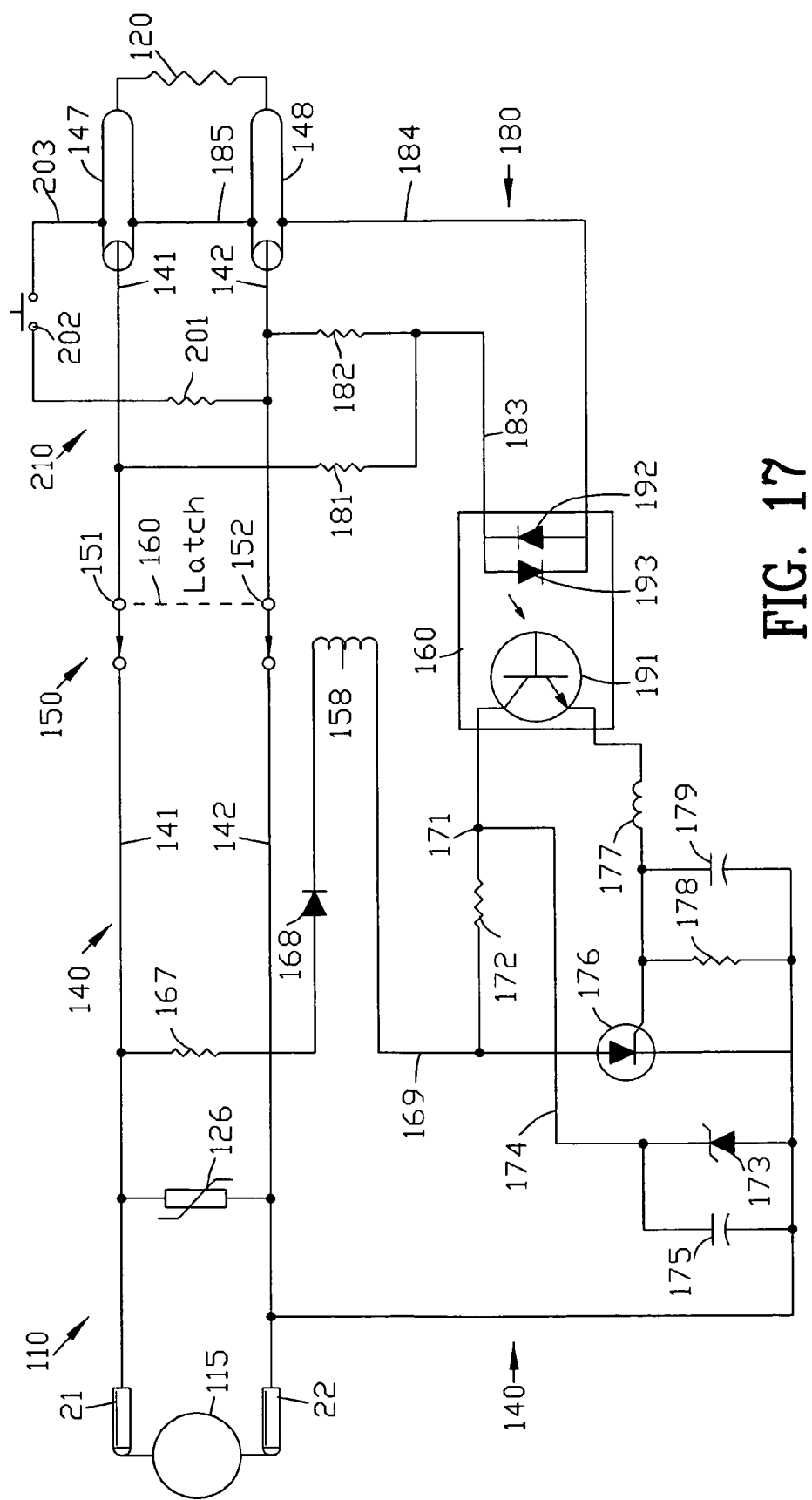
FIG. 17 is a circuit diagram of a second embodiment of the circuit of FIGS. 1-4.

FIG. 17 is a circuit diagram of a second embodiment of the circuit 110 of FIG. 14. Similar parts are labeled with similar reference numerals raised by the number 100. In this example, the electrical power source 115 is shown as a conventional 220 volt alternating current (AC) power source. Although the electrical power source 115 has been shown as conventional 220 volt alternating current (AC) power source, it should be appreciated by those skilled in the art that the present invention may be adapted to virtually any type of power source.

In this example, a voltage dropping resistor 167 is inserted in series between the first wire 141 and diode 168. In this example, the voltage divider network 171 is formed from resistor 172 and zener diode 173. The combination of the voltage dropping resistor 167 and the voltage divider network 171 comprising resistor 172 and zener diode 173 provides a minor conventional current through solenoid coil 158 to supply a collector voltage for the phototransistor 191. The operation of the second embodiment of the circuit 110 is essentially identical to the operation of the first embodiment shown in FIGS. 3-16.

FIG. 18 is a circuit diagram of a third embodiment of the circuit 210 of FIG. 14. In this embodiment of the invention the disconnect switch 250 is interposed between the source 215 and the load 230. The primary circuit 270 received operating power from a primary side or source side of the disconnect switch 250 by conductors 271 and 272. The secondary circuit 280 received operating power from a secondary side or load side of the disconnect switch 250 by conductors 281 and 282. The secondary circuit 280 is optically connected to the primary circuit 270 by the optocoupler 290.

In this example a conductor 292 connects a sensor 294 to the secondary circuit 280. The sensor 294 senses any leakage from either the first or the second wires 241 and 242. The sensor 294 may be the ground wire normally included in a conventional 110 volt alternating current power cord.

When the sensor 294 senses a leakage from either the first or the second wires 241 and 242, the secondary circuit 280 optically actuates the primary circuit 270 for opening the disconnect switch 250. The disconnect switch 250 may be any type of appropriate switch for disconnecting the source 215 from the load 230 including electrical, electronic or electrical-mechanical switches.

FIG. 19 is a circuit diagram of a fourth embodiment of the circuit 310 of FIG. 14. In this embodiment of the invention the disconnect switch 350 is interposed between the source 315 and the load 330. The primary circuit 370 received operating power from a primary side or source side of the disconnect switch 350 by conductors 371 and 372. The secondary circuit 380 received operating power from a secondary side or load side of the disconnect switch 350 by conductors 381 and 382. The secondary circuit 380 is optically connected to the primary circuit 370 by the optocoupler 390.

In this example a conductor 392 connects a sensor 394 to the secondary circuit 380. The sensor 394 senses any leakage from the load 330. When the sensor 394 senses a leakage from the load 330, the secondary circuit 380 optically actuates the primary circuit 370 for opening the disconnect switch 350.

Figure 20:
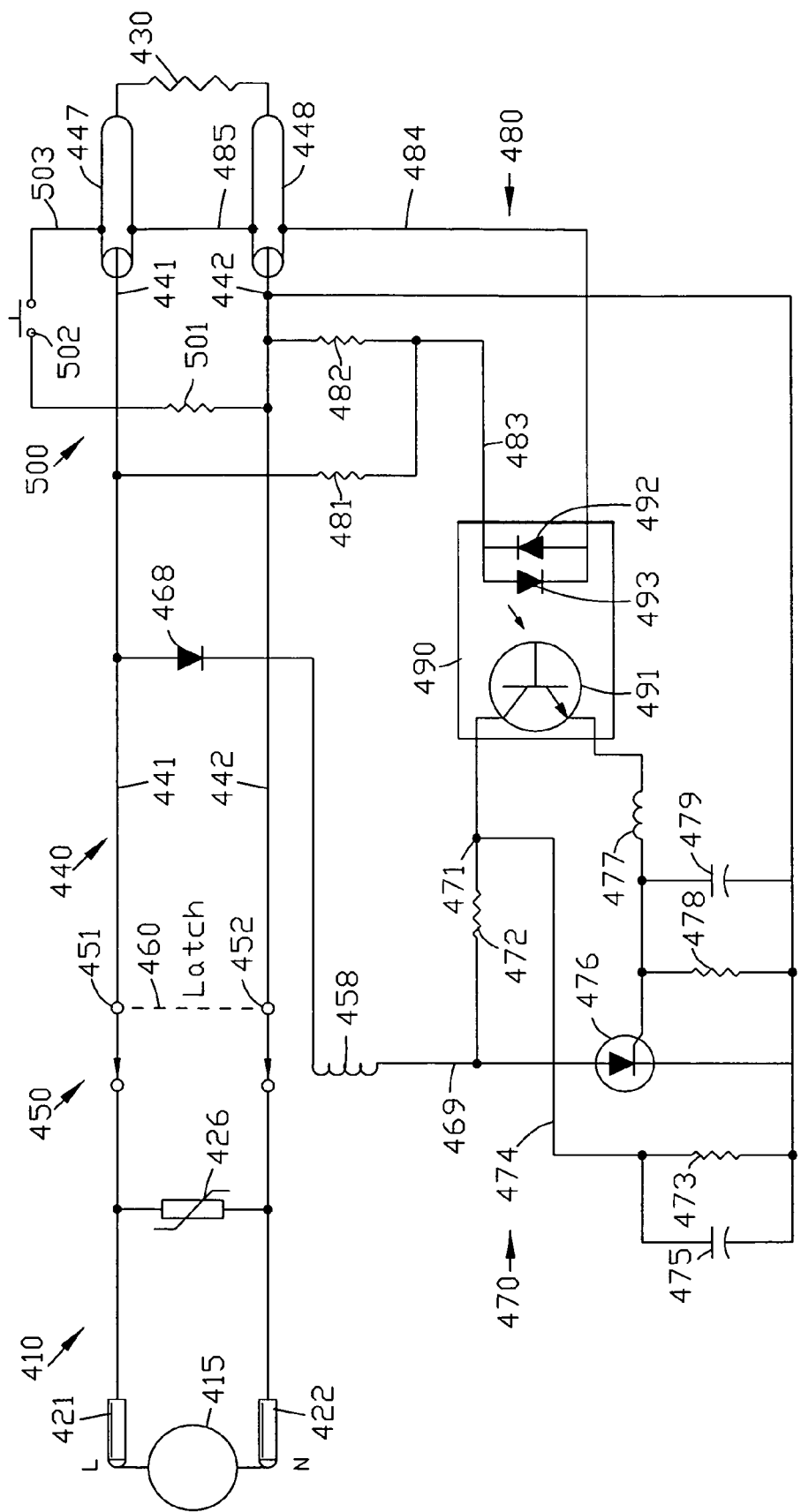
FIG. 20 is a circuit diagram of a fifth embodiment of the circuit of FIG. 14.

FIG. 20 is a circuit diagram of a fifth embodiment of the circuit 410 of FIGS. 1-4. Similar parts are labeled with similar reference numerals raised by the number 400. In this embodiment, the primary circuit 470 and the secondary circuit 480 of the circuit are located on the secondary side of the switch 440. The secondary side of switch 440 is located between the switch 440 and the load 430. The remainder of the fifth embodiment of the circuit 410 is essentially identical to the first embodiment of the circuit 10 shown in FIGS. 3-16.

This circuit 410 is may be used where it is desirable to have the primary circuit 470 and the secondary circuit 480 disconnected from the power source 420 upon the opening of the switch 440. The operation of the second embodiment of the circuit 110 is similar to the operation of the first embodiment shown in FIGS. 3-16.

The disconnect switch 450 defines a primary side 450P connected to the power source 415 and a secondary side 450S connected to the load 430. The nornally open disconnect switched 450 is mechanically closed to connect the first and second terminals 421 and 422 to the first and second wires 451 and 452 of the wire assembly 450.

Upon the application of power, conventional current flows from the secondary side 450S of the disconnect switched 450 through the solenoid coil 458 to the voltage divider network 471 to provide a direct current (DC) voltage for the primary circuit 470 and to the collector of phototransistor 491 of the optocoupler 490.

The voltage divider circuit 483 of the secondary circuit 480 is connected to the secondary side 450S of the disconnect switched 450 to provide operating voltage to the light emitting diodes 492 and 493. The light emitting diodes 492 and 493 are connected through conductor 484 to the shields 447 and 448.

In the absence of any leakage current between the either of the first and second wires 441 and 442 the respective shields 447 and 448, the light emitting diodes 92 and 93 will not illuminate the phototransistor 491 of the optocoupler 490. The thyristor 476 is maintained in a non-conductive condition, the disconnect switch 450 remains in the closed or reset condition.

In the presence of the leakage current between the either of the first and second wires 441 and 442 and the respective shields 447 and 448, the light emitting diodes 92 and 93 will illuminate the phototransistor 491 of the optocoupler 490. The phototransistor 491 of the optocoupler 490 causes conduction of the thyristor 476 to open the disconnect switch 450. The opening of the disconnect switch 450 completely isolates the power source 415 from the load 430.

In contrast to the previous embodiments set forth in FIGS. 1-19, upon the opening of the disconnect switch 440, both the primary circuit 470 and the secondary circuit 480 are disconnected from the power source 415. Upon the disconnected of the primary circuit 470 from the power source 415, the primary circuit 470 is incapable of electrically resetting or closing the disconnect switch 450.

Figure 21:
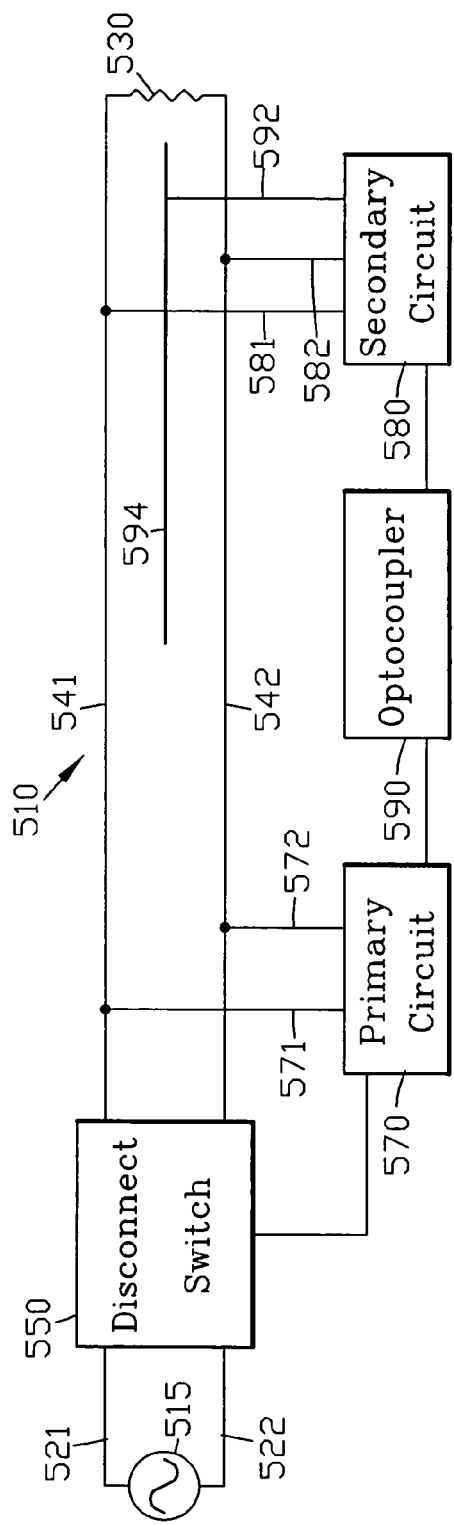
FIG. 21 is a circuit diagram of a sixth embodiment of the circuit of FIG. 14.

FIG. 21 is a circuit diagram of a fifth embodiment of the circuit 510 of FIG. 14. In this embodiment of the invention the disconnect switch 550 is interposed between the source 515 and the load 530. The primary circuit 570 received operating power from a primary side or source side of the disconnect switch 550 by conductors 571 and 572. The secondary circuit 580 received operating power from a secondary side or load side of the disconnect switch 550 by conductors 581 and 582. The secondary circuit 580 is optically connected to the primary circuit 570 by the optocoupler 590.

In this example a conductor 592 connects a sensor 594 to the secondary circuit 580. The sensor 594 senses the leakage from either the first or the second wires 541 and 542. The sensor 594 may be the ground wire normally included in a conventional 110 volt alternating current power cord.

When the sensor 594 senses a leakage from either the first or the second wires 541 and 542, the secondary circuit 580 optically actuates the primary circuit 570 for opening the disconnect switch 550. The disconnect switch 550 may be any type of appropriate switch for disconnecting the source 515 from the load 530 including electrical, electronic or electrical-mechanical switches.

Figure 22:
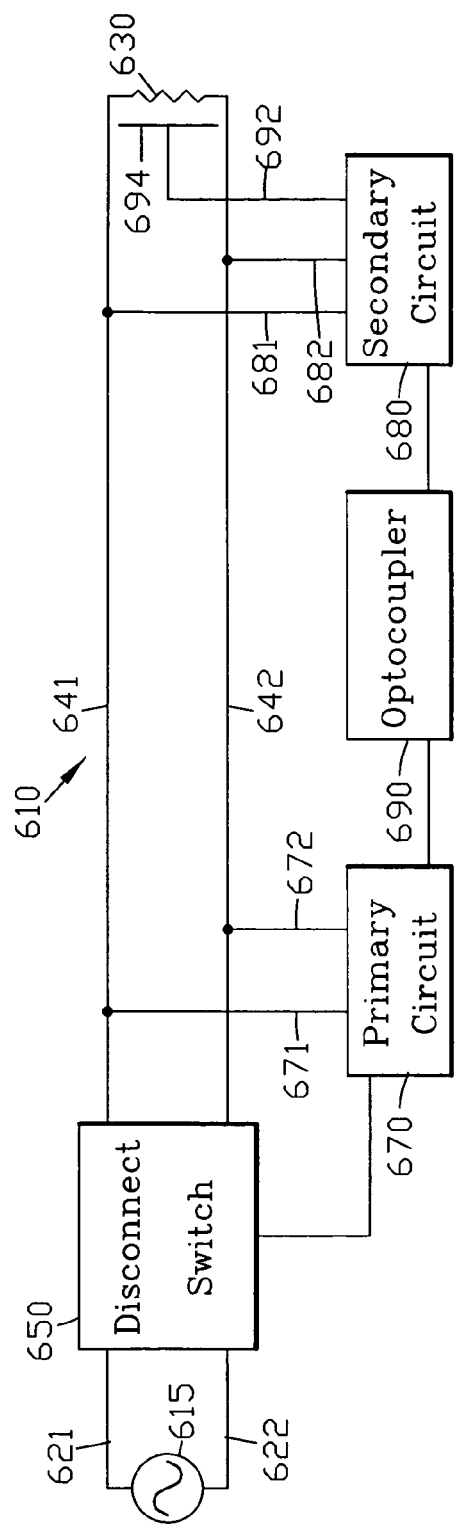
FIG. 22 is a circuit diagram of a seventh embodiment of the circuit of FIG. 14.

FIG. 22 is a circuit diagram of a sixth embodiment of the circuit 610 of FIGS. 1-4. In this embodiment of the invention the disconnect switch 650 is interposed between the source 615 and the load 630. The primary circuit 670 received operating power from a primary side or source side of the disconnect switch 650 by conductors 671 and 672. The secondary circuit 680 received operating power from a secondary side or load side of the disconnect switch 650 by conductors 681 and 682. The secondary circuit 680 is optically connected to the primary circuit 670 by the optocoupler 690.

In this example a conductor 692 connects a sensor 694 to the secondary circuit 680. The sensor 694 senses the leakage from the load 630. When the sensor 694 senses the leakage from the load 630, the secondary circuit 680 optically actuates the primary circuit 670 for opening the disconnect switch 650.

FIG. 23 is a view of an eighth embodiment of a circuit 710 of the present invention illustrating a housing 720 similar to the housing 20 shown in FIGS. 1-3 with an alternate empower cable 740 extending from the housing 720.

The circuit 710 contained within the housing 720 connects the line lug 721, the neutral lug 722 and the ground lug 723 of the housing 720 to a first and a second wire 741 and 742. In this example, the first and second wires 741 and 742 shown as a line wire 741 and a neutral wire 742 and a ground wire 743 are located within the power cable 740.

The line wire 741, the neutral wire 742 and the ground wire 743 are surrounded by insulations 741I-743I in a conventional fashion. A drain wire 744 defines a first and a second portion 745 and 746 and extends along the substantial totality of the power cable 740. A conductive shield 747 surrounds the line wire 741, the neutral wire 742 and the grounding wire 743. An outer insulating layer 748 is molded about the conductive shield 747.

FIG. 24 is an enlarged sectional view along line 24-24 in FIG. 23 illustrating the power cable 740 with the first wire 741, the second wire 742 and the grounding wire 743 surrounded within the conductive shield 747. In this embodiment, the drain wire 744 is located within the conductive shield 747. The first portion 745 of the drain wire 744 is non-insulated and in contact with the conductive shield. The first portion 745 of the drain wire 744 extends along substantially the total length of the conductive shield 747. The second portion 746 of the drain wire 744 may or may not be insulated. Furthermore, the first portion 745 and the second portion 746 of the drain wire 744 may be two separate electrically interconnected wires (not shown). Preferably, the drain wire 744 is a thin copper or aluminum wire.

The outer insulating layer 748 establishes a mechanical engagement between the first portion 745 of the drain wire 744 and the conductive shield 747 to provide an electrical connection between the drain wire 44 and the conductive shield 747. Preferably, the outer insulating layer 748 resiliently urges the conductive shield 747 into mechanical engagement with the drain wire 744 to provide the electrical connection between the drain wire 744 and the conductive shield 747.

FIG. 25 is a view similar to FIG. 24 illustrating a power cable 740A with the first wire 741, the second wire 742 and the grounding wire 743 surrounded within the conductive shield 747. In this embodiment, the drain wire 744 is located outside of the conductive shield 747. The outer insulating layer 748 resiliently urges the drain wire 744 into mechanical engagement with the conductive shield 747 to provide the electrical connection between the drain wire 744 and the conductive shield 747.

FIG. 26 is a view similar to FIG. 24 of an alternate embodiment illustrating the power cable 740B having the first wire 741, the second wire 742 and the drain wire 744. In this embodiment, the drain wire 744 is located within the conductive shield 747. The power cable 740 is void of the ground wire 743 shown in FIGS. 24 and 25. The outer insulating layer 748 resiliently urges the conductive shield 747 into mechanical engagement with the drain wire 744 to provide the electrical connection between the drain wire 744 and the conductive shield 747.

FIG. 27 is a view similar to FIG. 27 of another embodiment illustrating the power cable 740C having the first wire 741, the second wire 742 and the drain wire 744. In this embodiment, the drain wire 744 is located outside of the conductive shield 747. The outer insulating layer 748 resiliently urges the drain wire 744 into mechanical engagement with the conductive shield 747 to provide the electrical connection between the drain wire 744 and the conductive shield 747.

It should be appreciated by those skilled in the art that the present invention is not limited to the cross-sectional shape of the power cord 40 or the specific types of wires and/or insulations described and illustrated herein.

FIGS. 28-31 illustrate various examples of conductive shields 747D-747G suitable for use with the present invention. The conductive shields 747D-747G are shown as thin conductive materials 796D-796G. Typically, the thin conductive materials 796D-796G of the conductive shields 747D-747G are unsuitable for direct connection to the interrupter circuit 10.

The drain wires 744 facilitate electrical connection between the conductive shields 747D-747G and the interrupter circuit 10 of the present invention. The first portion 745 of the drain wire 744 extends along the length of the power cable 740 for electrically connecting the drain wire 744 to the conductive shields 747D-747G. The second portion 746 of the drain wire 744 provides a suitable conductor for connection to the interrupter circuit 10.

The use of thin conductive shields 747D-747G, substantially reduces the material cost over the use of plural conductive shield surrounding the first wire and the second wire of the prior art. Furthermore, the use of an aluminum material for the conductive shields 747D-747G substantially reduces the material cost over the use a copper material.

FIG. 28 is a first example of a conductive shield 747D suitable for use with any of the configurations of the power cables 740-740C shown in FIGS. 24-27. The conductive shield 747D is urged into mechanical and electrical contact with the drain wire 744D by the outer insulator 748D. In the alternative, the drain wire 744D may be urged into mechanical and electrical contact with the conductive shield 747D by the outer insulator 748D. In this example, the conductive shield 747D is shown as a thin metallic foil 796D such as aluminum foil, copper foil or the like. Preferably, the thin metallic foil has a thickness of 0.001 to 0.005 inches.

FIG. 29 is a second example of a conductive shield 747E suitable for use with the configurations of the power cables 740A and 740C shown in FIGS. 25 and 27. The drain wire 744E is urged into mechanical and electrical contact with the conductive shield 747E by the outer insulator 748E. In this example, the conductive shield 747E is shown as a thin insulating polymeric material 795E with a metallic conductive coating 796E located on one side of the insulating polymeric material 795E. The metallic conductive coating 796E is located on the side of the insulating polymeric material 796E facing the drain wire 744E. One material suitable for use as the conductive shield 747E is a polyester film covered with an aluminum coating or a copper coating.

FIG. 30 is a third example of a conductive shield 747F suitable for use with any of the configurations of the power cables 740-740C shown in FIGS. 24-27. The conductive shield 747F is urged into mechanical and electrical contact with the drain wire 744 by the outer insulator 748. In this example, the conductive shield 747F is shown as a thin insulating polymeric material 765F coated with metallic conductive coatings 796F and 797F located on opposed sides of the insulating polymeric material 795F. The metallic conductive coating 796F faces the drain wire 744F whereas the metallic conductive coating 797F faces the first and second wires 741 and 742.

FIG. 31 is a fourth example of a conductive shield 747G suitable for use with any of the configurations of the power cables 740A-740C shown in FIGS. 24-27. The conductive shield 7470 is urged into mechanical and electrical contact with the drain wire 744G by the outer insulator 748G. In the alternative, the drain wire 744G may be urged into mechanical and electrical contact with the conductive shield 747G by the outer insulator 748G. In this example, the conductive shield 747G is shown as a thin organic conductive polymer 796G. The Wikipedia encyclopedia list the common classes of organic conductive polymers as poly(acetylene)s, poly(pyrrole)s, poly(thiophene)s, poly(aniline)s, poly(fluorene)s, polynaphthalenes, poly(p-phenylene sulfide), and poly(paraphenylene vinylene)s. Classically, these compounds are known as polyacetylene, polyaniline, etc. "blacks" or "melanins". The melanin pigment in animals is generally a mixed copolymer of polyacetylene, polypyrrole, and polyaniline.

FIG. 32 is a block diagram of the eighth embodiment of a circuit 710 of the present invention shown in FIG. 23. The circuit 710 disconnects the electrical power source 715 from the load 730 upon the detection of a leakage current within the power cable 740. In this example, the electrical power source 715 is shown as a conventional 110 volt alternating current (AC) power source. The first terminal 21 is the line terminal whereas the second terminal 22 is the neutral terminal. Although the electrical power source 12 has been shown as conventional 110 volt alternating current (AC) power source, it should be appreciated by those skilled in the art that the present invention may be adapted to virtually any type of power source.

The circuit 710 comprises a disconnect switch 750 interposed connecting the first and second lugs 721 and 722 to the first and second wires 741 and 742 of the wire assembly 740. The first and second lugs 721 and 722 are engaged with the power source 715.

A primary circuit 770 is connected to the disconnect switch 750 for controlling the disconnect switch 750. The primary circuit 770 opens the disconnect switch 750 upon the secondary circuit 780 sensing at leakage current from one of the first and second wires 741 and 742.

A secondary circuit 780 is located between the disconnect switch 750 and the load 730 for sensing a leakage current between the one of the first and second wires 741 and 742 and the conductive shields 747.

An optical switch 790 interconnects the primary circuit 770 and the secondary circuit 780 for opening the disconnect switch 750 upon the secondary circuit 780 sensing a leakage current within the wire assembly 740 for completely electrically disconnecting the power source 715 from the load 730 and completely electrically disconnecting the primary circuit 770 and the secondary circuit 780.

Figure 33:
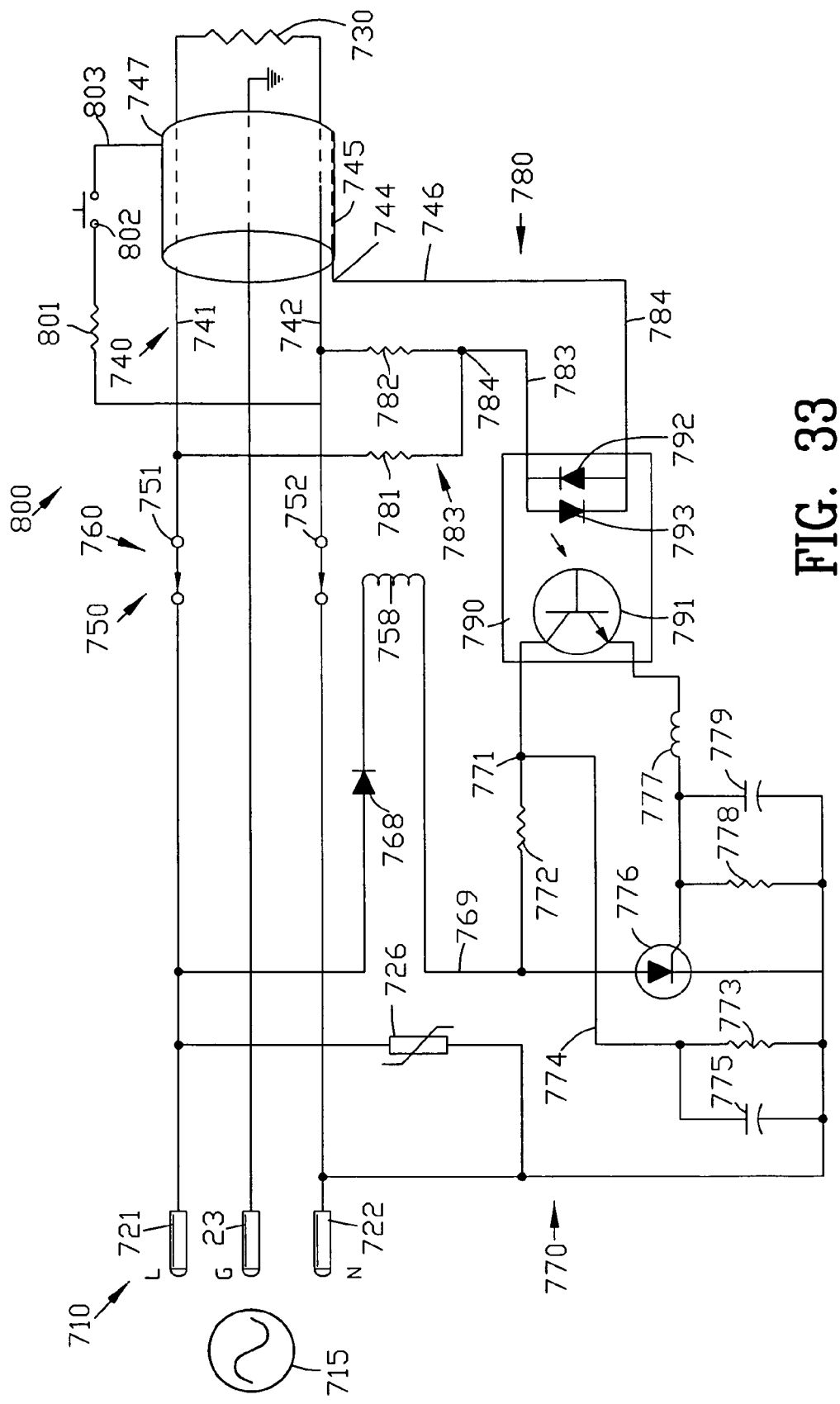
FIG. 33 is a circuit diagram of the block diagram of FIG. 28.

FIG. 33 is a circuit diagram of the block diagram of FIG. 32. The first and second terminals 721 and 722 extending from the housing 720 are connected to an input side of the disconnect switch 750. The output side of the disconnect switch 750 is connected to the first wire 741 and the second wire 742 of the wire assembly 740. The first and second switches 751 and 752 of the disconnect switch 750 interconnect the first and second terminals 721 and 722 to the first and second wires 741 and 742. The disconnect switch 750 is shown in the closed or reset condition.

An optional ground wire 743 bypasses the disconnect switch 750 and passes to ground the load 730 in a conventional fashion. A surge suppressor shown as a metal oxide varistor 126 is connected across the first and second terminals 721 and 722.

The primary circuit 770 is located on a primary side of the disconnect switch 750 for controlling the disconnect switch 750. The primary circuit 770 opens the disconnect switch 750 upon the secondary circuit 780 sensing a leakage current from one of the first and second wires 41 and 42 and the conductive shield 747.

The disconnect switch 750 is controlled through the solenoid coil 758 by the primary circuit 770. A diode 768 providing power through the solenoid coil 758 of the disconnect switch 750 to a conductor 769 to power the primary circuit 770. The solenoid coil 758 is connected to a voltage divider network 771 comprising resistor 772 and resistor 773. A capacitor 775 is connected across the resistor 773 of the voltage divider network 771. The conductor 769 is connected to a switch shown as a thyristor or silicon controlled rectifier 776.

The voltage divider network 771 is connected to the collector of the phototransistor 791 of the optocoupler 790. A coil 777 connects the emitter of phototransistor 791 to the gate of the thyristor 776. A pull down resistor 778 and a capacitor 779 are connected to the gate of the thyristor 776.

The secondary circuit 780 comprises resistor 781 and 782 forming a voltage divider network 783. The voltage divider network 783 is connected to light emitting diodes 792 and 793 within the optocoupler 790. A connector 784 connects the light emitting diodes 792 and 793 to the second portion 746 of the drain wire 744. The first portion 745 of the drain wire 744 extends along substantially the total length of the conductive shield 747. The second portion 746 of the drain wire 744 may or may not be insulated. Furthermore, the first portion 745 and the second portion 746 of the drain wire 744 may be two separate electrically interconnected wires.

An optional test circuit 800 may be included for testing the circuit 710. The optional test circuit 800 comprises resistor 801 connected to the wire 742 of the wire assembly 740. A momentary switch 802 connects the resistor 801 to the shield 747 surrounding the first second wire 741 through a conductor 803.

The operation of the circuit 710 in FIG. 29 is set forth below. The circuit breaker 750 is shown in the closed position as shown in FIG. 5. Power is applied to the circuit 710 by inserting the first and second lugs 721 and 722 and the ground lug 723 extending from the housing 720 into the electrical receptacle 716 shown in FIG. 1.

Upon the application of power, conventional current flows from diode 768 through the solenoid coil 758 to the voltage divider network 771. The diode 768 in combination with solenoid coil 758 provides a direct current (DC) voltage for the primary circuit 770. The conductor 769 applies power to the voltage divider network 771 and to the anode of the thyristor 776. The capacitor 775 assists in reducing alternating current (AC) voltage ripple within the voltage divider network 771. The voltage divider network 771 provides operating voltage to the collector of phototransistor 791. The total resistance of resistors 772 and 773 of the voltage divider network 771 is selected to establish a minor conventional current flow through the solenoid coil 758. The minor voltage through the solenoid coil 758 is insufficient to actuate the disconnect switch 750.

The voltage divider circuit 783 of the secondary circuit 780 provides operating voltage to the light emitting diodes 792 and 793. The light emitting diodes 792 and 793 transfer voltage through conductor 784 and the drain wire 744 to appear along substantially the total length of the conductive shield 747.

In the absence of a leakage current between the conductive shield 747 and any of the first wire 741, the second wires 742 or the ground wire 743, zero current will flow through the conductive shield 747 and the drain wire 744 through the light emitting diodes 792 and 793. With zero current flowing through the light emitting diodes 792 and 793, will not illuminate the phototransistor 791. The absence of illumination of the phototransistor 791 will keep the gate of the thyristor 776 in a low voltage condition. The pull down resistor 778 and capacitor 779 in combination with the coil 777 prevents inadvertent actuation of the thyristor 776 by electrical transients. As long as thyristor 776 is in a non-conductive condition, the disconnect switch 750 remains in the closed or reset condition.

In the event of a leakage appearing between the conductive shield 747 and any of the first wire 741, the second wire 742 or the ground wire 743, the leakage current will flow through the conductive shield 747 and the drain wire 744 through one of the light emitting diodes 792 and 793. The leakage current will flow through the light emitting diodes 792 and 793 illuminates the phototransistor 791. Upon illumination of the phototransistor 791, phototransistor 791 conducts conventional current from the collector to the emitter. The charge on capacitor 775 flows through phototransistor 791 raising the voltage on the gate of the thyristor 776 to institute conduction of the thyristor 776. The conduction of the thyristor 776 results in a major conventional current flow through the solenoid coil 758. The major conventional current flow through the solenoid coil 758 actuates the plunger 759 to open the disconnect switch 750. The opening of the circuit breaker 750 disconnects the AC power to the power cable 740 and the load 730. The opening of the disconnect switch 750 completely isolates the power source 715 from the load 730. The optical coupling between the phototransistor 791 and the light emitting diodes 792 and 793 completely electrically isolates the primary circuit 770 from the secondary circuit 780.

The test circuit 800 operates in a similar manner by simulating a leakage current between the conductive shield 747 and the second wire 742. The test circuit 800 maybe connected to any of the wires 741-743 of the power cable 740. A momentary depression of momentary switch 802 causes a test current to flow from the second wire 742 through resistor 801 and conductor 803 to the shield 747. The test current is passed by drain wire 744 through one of the light emitting diodes 792 and 793. The leakage current through one of the light emitting diodes 792 and 793 illuminates the phototransistor 791 to actuate the thyristor 776 to open the disconnect switch 750 as described previously. The opening of the circuit breaker 750 disconnects the AC power to the power cable 740 and the load 730. The opening of the disconnect switch 750 completely isolates the power source 715 from the load 730.

Although the invention has been shown as a 120 volt single phase system or a 240 volt single phase system, it should be appreciated that the present invention is equally applicable to virtually all single phase and polyphase systems.

The present invention provide a circuit for disconnecting a power source upon the detection of a leakage current that incorporates an improved conductive shield for the detection of a leakage current. The incorporation of the improved conductive shield provides a more economical solution than similar units of the prior art. The improved conductive shield may be incorporated into existing line cord packages.

The present invention has been shown in a preferred form employed within a circuit contained within a housing 20 fashioned in the form of an electrical plug. However, it should be understood that the present invention may be applied to of various types of protection devices for protecting all types of electrical cords, electrical transmission lines and electrical circuits. Furthermore, the present invention has been shown with an air conditioning unit 32 as the load 30 but it should be understood that the circuit 10 of the present invention is suitable for use with a large variety of power sources and load as should be apparent to those skilled in the art.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A circuit for disconnecting a power source upon the detection of a leakage current, comprising:
    a leakage current circuit comprising a disconnect switch;
    a power cable connected to the power source though said disconnect switch;
    said power cable consisting of:
        a. a first insulated wire and a second insulated wire;
        b. an insulated ground wire;
        c. a conductive shield surrounding all of said first and second insulated wires and said insulated ground wire;
        d. a drain wire having a first and a second portion with said first portion of said drain wire being in contact with said conductive shield; and
        e. an outer insulating layer disposed about said conductive shield and said first portion of said drain wire; and
    a conductor connecting said second portion of said drain wire to said leakage current circuit for opening said disconnect switch upon said leakage current circuit sensing a leakage current between said conductive shield and one of said first and second insulated wires and said insulated ground wire to disconnect said power cable from the power source.

2. A circuit for disconnecting a power source upon the detection of a leakage current as set forth in claim 1, wherein said conductive shield is an insulating polymeric sheet with a metallic coating.

3. A circuit for disconnecting a power source upon the detection of a leakage current as set forth in claim 1, wherein said conductive shield is an insulating polymeric sheet with an aluminum coating.

4. A circuit for disconnecting a power source upon the detection of a leakage current as set forth in claim 1, wherein said conductive shield is a metallic foil.

5. A circuit for disconnecting a power source upon the detection of a leakage current as set forth in claim 1, wherein said conductive shield is an aluminum foil.

6. A circuit for disconnecting a power source upon the detection of a leakage current as set forth in claim 1, wherein said conductive shield is an organic conductive polymeric material.

7. A circuit for disconnecting a power source upon the detection of a leakage current, comprising:
    a leakage current circuit comprising a disconnect switch;
    a power cable connected to the power source though said disconnect switch;
    said power cable consisting of:
        a. a first insulated wire and a second insulated wire;
        b. an insulated ground wire;
        c. a conductive shield consisting of an insulating polymeric sheet with a conductive coating surrounding all of said first and second insulated wires and said insulated ground wire;
        d. a drain wire having a first and a second portion with said first portion of said drain wire being in contact with said conductive coating of said conductive shield; and
        d. an outer insulating layer disposed about said conductive shield and said first portion of said drain wire; and
    a conductor connecting said second portion of said drain wire to said leakage current circuit for opening said disconnect switch upon said leakage current circuit sensing a leakage current between said conductive coating and one of said first and second insulated wires and said insulated ground wire to disconnect said power cable from the power source.

8. A circuit for disconnecting a power source upon the detection of a leakage current as set forth in claim 7, wherein said conductive coating of said conductive shield is an aluminum coating.

9. A circuit for disconnecting a power source upon the detection of a leakage current, comprising:
    a leakage current circuit comprising a disconnect switch;
    a power cable connected to the power source though said disconnect switch;
    said power cable consisting of:
        a. a first insulated wire and a second insulated wire;
        b. a conductive shield surrounding both of said first and second insulated wires;
        c. a drain wire having a first and a second portion with said first portion of said drain wire being in contact with said conductive shield; and
        d. an outer insulating layer disposed about said conductive shield and said first portion of said drain wire; and
    a conductor connecting said second portion of said drain wire to said leakage current circuit for opening said disconnect switch upon said leakage current circuit sensing a leakage current between said conductive shield and one of said first and second insulated wires to disconnect said power cable from the power source.

10. An improved power cable for use with a leakage current detection and interruption circuit for disconnecting a power source upon the detection of a leakage current within the improved power cable, the improved power cable consisting of:
- a. an first insulated wire and a second insulated wire;
- b. an insulated ground wire;
- c. a conductive shield consisting of an insulating polymeric sheet with a conductive coating surrounding all of said first and second insulated wires and said insulated ground wire;
- d. a drain wire having a first and a second portion with said first portion of said drain wire being in contact with said conductive coating of said conductive shield; and
- e. an outer insulating layer disposed about said conductive shield and said first portion of said drain wire; and said second portion of said drain wire being connected to the leakage current detection and interruption circuit for disconnecting the power source upon the detection of a leakage current within the improved power cable between said conductive coating and one of said first and second insulated wires and said insulated ground wire.

11. An improved power cable for use with a leakage current detection and interruption circuit for disconnecting a power source upon the detection of a leakage current within the improved power cable, the improved power cable consisting of:
- a. an first insulated wire and a second insulated wire;
- b. a conductive shield consisting of an insulating polymeric sheet with a conductive coating surrounding all of said first and second insulated wires;
- c a drain wire having a first and a second portion with said first portion of said drain wire being in contact with said conductive coating of said conductive shield; and
- d. an outer insulating layer disposed about said conductive shield and said first portion of said drain wire; and said second portion of said drain wire being connected to the leakage current detection and interruption circuit for disconnecting the power source upon the detection of a leakage current within the improved power cable between said conductive coating and one of said first and second insulated wires.

* * * * *